US012720195B2

(12) United States Patent
Wang

(10) Patent No.: US 12,720,195 B2
(45) Date of Patent: Aug. 25, 2026

(54) PHOTOGRAPHING MODE SWITCHING METHOD AND RELATED APPARATUS

(71) Applicant: HONOR DEVICE CO., LTD., Shenzhen (CN)

(72) Inventor: Jianxian Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 41 days.

(21) Appl. No.: 18/993,877

(22) PCT Filed: Aug. 23, 2023

(86) PCT No.: PCT/CN2023/114442
§ 371 (c)(1),
(2) Date: Jan. 13, 2025

(87) PCT Pub. No.: WO2024/109213
PCT Pub. Date: May 30, 2024

(65) Prior Publication Data

US 2026/0019703 A1 Jan. 15, 2026

(30) Foreign Application Priority Data

Nov. 22, 2022 (CN) ........................ 202211468025.5

(51) Int. Cl.

| | |
|---|---|
| ***H04N 23/667*** | (2023.01) |
| ***G06T 1/20*** | (2006.01) |
| ***G06T 5/70*** | (2024.01) |
| ***H04N 23/61*** | (2023.01) |
| ***H04N 23/63*** | (2023.01) |
| ***H04N 23/80*** | (2023.01) |

(52) U.S. Cl.
CPC ............ *H04N 23/667* (2023.01); *G06T 1/20* (2013.01); *G06T 5/70* (2024.01); *H04N 23/61* (2023.01); *H04N 23/632* (2023.01); *H04N 23/815* (2023.01)

(58) Field of Classification Search
None
See application file for complete search history.

(56) References Cited

U.S. PATENT DOCUMENTS

2022/0182546 A1 6/2022 Hua
2022/0247919 A1* 8/2022 O'Leary .............. H04N 5/2628
2023/0188830 A1 6/2023 Chen et al.

FOREIGN PATENT DOCUMENTS

CN 104243822 A 12/2014
CN 108513062 A 9/2018
CN 110505389 A 11/2019
(Continued)

*Primary Examiner* — Mark T Monk
(74) *Attorney, Agent, or Firm* — Fish & Richardson P.C.

(57) ABSTRACT

This application provides a photographing mode switching method and a related apparatus. When detecting an operation of switching from a first photographing mode to a second photographing mode, an electronic device may obtain preview data in the first photographing mode from a memory by invoking a GPU, and downsample the preview data to a specified image size, to obtain a downsampled image of a specified data type; and perform blurring processing on the downsampled image of the specified data type returned by the GPU, to obtain a blurred image, and display the blurred image in a preview box in a coverage manner.

20 Claims, 22 Drawing Sheets

(56) References Cited

FOREIGN PATENT DOCUMENTS

| | | | |
|---|---|---|---|
| CN | 110896451 | A | 3/2020 |
| CN | 113395441 | A | 9/2021 |
| CN | 113473005 | A | 10/2021 |
| CN | 113596321 | A | 11/2021 |
| CN | 113766120 | A | 12/2021 |
| CN | 114268741 | A | 4/2022 |

* cited by examiner

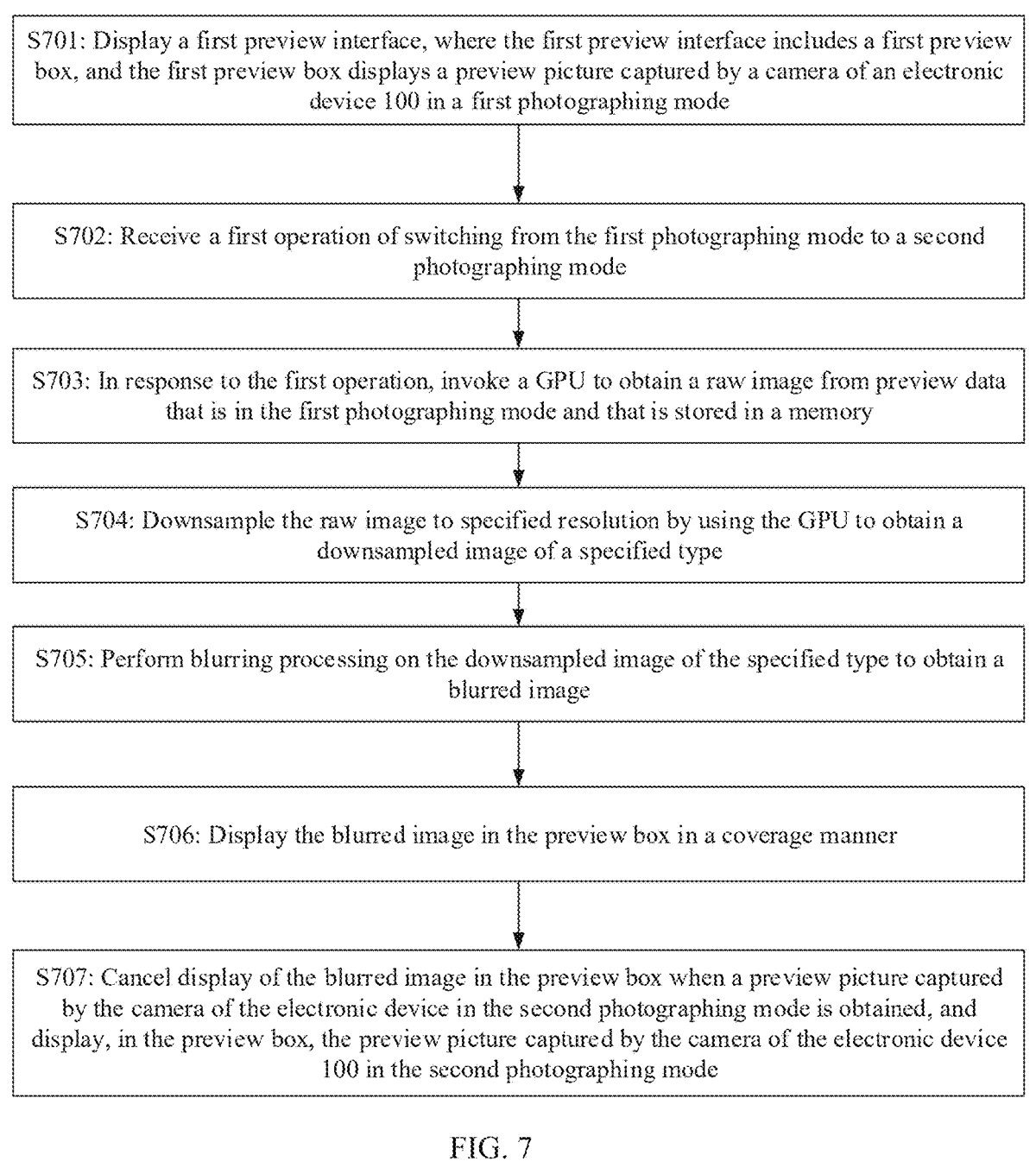

S701: Display a first preview interface, where the first preview interface includes a first preview box, and the first preview box displays a preview picture captured by a camera of an electronic device 100 in a first photographing mode S702: Receive a first operation of switching from the first photographing mode to a second photographing mode S703: In response to the first operation, invoke a GPU to obtain a raw image from preview data that is in the first photographing mode and that is stored in a memory S704: Downsample the raw image to specified resolution by using the GPU to obtain a downsampled image of a specified type S705: Perform blurring processing on the downsampled image of the specified type to obtain a blurred image S706: Display the blurred image in the preview box in a coverage manner S707: Cancel display of the blurred image in the preview box when a preview picture captured by the camera of the electronic device in the second photographing mode is obtained, and display, in the preview box, the preview picture captured by the camera of the electronic device 100 in the second photographing mode

FIG. 7

PHOTOGRAPHING MODE SWITCHING METHOD AND RELATED APPARATUS

CROSS-REFERENCE TO RELATED APPLICATIONS

This application is a National Stage of International Application No. PCT/CN2023/114442, filed on Aug. 23, 2023, which claims priority to Chinese Patent Application No. 202211468025.5, filed on Nov. 22, 2022, both of which are hereby incorporated by reference in their entireties.

TECHNICAL FIELD

This application relates to the field of computer vision technologies, and in particular, to a photographing mode switching method and a related apparatus.

BACKGROUND

With the development of smartphones, photographing and video recording have become one of most important features. With increasingly powerful photographing and video recording functions of an electronic device such as a smartphone, more people use an electronic device such as a smartphone to take a photo instead of a professional camera, and there is an increasing quantity of photographing modes on an electronic device such as a smartphone.

When using a photographing preview of an electronic device such as a smartphone, a user may switch between different photographing modes to preview photographing effects in different photographing modes. Because different photographing modes correspond to different photographing parameters and different image processing algorithms, when the electronic device switches from one photographing mode to another photographing mode, specific time is required. Consequently, during switching of the photographing mode, the electronic device cannot obtain a preview data stream in a period of time. As a result, a picture cannot be displayed in a preview box in a period of time, leading to poor viewing experience of the user.

SUMMARY

This application provides a photographing mode switching method and a related apparatus, so that during switching from a first photographing mode to a second photographing mode, a raw image can be quickly obtained from preview data, and be processed into a blurred image and be displayed in a preview box in a coverage manner, preventing a case that a photographing interface displays no picture due to interruption of a preview data stream in the first photographing mode.

According to a first aspect, this application provides a photographing mode switching method, applied to an electronic device having a camera. The method includes: displaying a first preview interface, where the first preview interface includes a first preview box, the first preview box displays a preview picture captured by the camera of the electronic device in a first photographing mode, and resolution of the preview picture captured by the camera of the electronic device in the first photographing mode is first resolution: receiving a first operation of switching from the first photographing mode to a second photographing mode, where the first photographing mode is different from the second photographing mode; in response to the first operation, invoking a graphics processing unit GPU to obtain a raw image from preview data that is in the first photographing mode and that is stored in a memory, where the preview data in the first photographing mode is used to display, in the first preview box, the preview picture captured in the first photographing mode; downsampling the raw image to specified resolution by using the GPU to obtain a downsampled image of a specified type, where the specified resolution is less than the first resolution; performing blurring processing on the downsampled image of the specified type to obtain a blurred image; displaying the blurred image in the preview box in a coverage manner; and cancelling display of the blurred image in the preview box when a preview picture captured by the camera of the electronic device in the second photographing mode is obtained, and displaying, in the preview box, the preview picture captured by the camera of the electronic device in the second photographing mode.

According to the photographing mode switching method provided in this application, when detecting an operation of switching from the first photographing mode to the second photographing mode, the electronic device invokes the GPU to obtain the preview data in the first photographing mode from the memory, and downsamples the preview data to a specified image size to obtain the downsampled image of the specified data type; and performs blurring processing on the downsampled image of the specified data type returned by the GPU, to obtain the blurred image, and displays the blurred image in the preview box in a coverage manner. In this way, the preview data is downsampled while being obtained by using the GPU, so that a process of obtaining the downsampled image can be accelerated, and the blurred image can be quickly displayed in the preview box, preventing a case that a photographing interface displays no picture due to interruption of a preview data stream in the first photographing mode.

In a possible implementation, before the receiving a first operation of switching from the first photographing mode to a second photographing mode, the method further includes: recognizing a photographing scene and determining the second photographing mode based on the photographing scene; and displaying, in the preview interface, a first control corresponding to the second photographing mode, where the first operation is an operation performed on the first control.

In this manner, a photographing mode related to a user may be automatically recommended based on a photographing scene, thereby improving photographing experience of the user.

In a possible implementation, the first preview interface further includes an AI scene recognition control. Before the recognizing a photographing scene and determining the second photographing mode based on the photographing scene, the method further includes: receiving a second operation performed on the AI scene recognition control. The recognizing a photographing scene and determining the second photographing mode specifically includes: recognizing the photographing scene in response to the second operation, and determining the second photographing mode based on the photographing scene.

In this manner, an AI scene recognition function is manually enabled by a user, to automatically recommend, based on a photographing scene, a photographing mode related to the user, thereby improving photographing experience of the user.

In a possible implementation, that the preview box displays a preview picture captured by the camera of the electronic device in a first photographing mode specifically includes: After obtaining the preview data in the first photographing mode by using the camera, a camera hardware abstraction layer of the electronic device passes preview data in the second photographing mode through a camera service framework layer of the electronic device; the camera service framework layer stores the preview data in the first photographing mode in a memory region of a display control module at an application framework layer on the electronic device; and the display control module displays, in the preview box based on the preview data in the first photographing mode in the memory region of the display control module, the preview picture captured by the camera of the electronic device in the first photographing mode In this manner, the preview picture in the first photographing mode is displayed in the preview box by using functional modules.

In a possible implementation, the receiving a first operation of switching from the first photographing mode to a second photographing mode specifically includes: detecting, by using a mode switching module in a camera application on the electronic device, the second operation of switching from the first photographing mode to the second photographing mode. The method further includes: The mode switching module sends a mode switching instruction to a blurry frame capture module in the camera application, and sends an instruction for switching to the second photographing mode to the camera hardware abstraction layer on the electronic device; the blurry frame capture module obtains a memory address of the display control module at the application framework layer on the electronic device, where a memory region corresponding to the memory address of the display control module stores the preview data in the first photographing mode; and the blurry frame capture module sends the memory address of the display control module to a GPU hardware rendering layer at the application framework layer. The invoking a graphics processing unit GPU to obtain a raw image from preview data that is in the first photographing mode and that is stored in a memory specifically includes: After obtaining the memory address of the display control module, the GPU hardware rendering layer controls the GPU to obtain the raw image from the memory region corresponding to the memory address of the display control module.

In a possible implementation, that the blurry frame capture module sends the memory address of the display control module to a GPU hardware rendering layer at the application framework layer specifically includes: The blurry frame capture module sends the memory address of the display control module to the GPU hardware rendering layer at the application framework layer by using a pixel copy pixel copy interface.

In a possible implementation, the downsampling the raw image to specified resolution by using the GPU to obtain a downsampled image of a specified type specifically includes: After obtaining the raw image of a first data type from the memory region corresponding to the memory address of the display control module, the GPU downsamples the raw image of the first data type to the specified resolution, and converts the raw image of the first data type into a specified data type to obtain the downsampled image, where a data type of the downsampled image is the specified type, and the specified type is different from the first data type; and the GPU returns the downsampled image to the blurry frame capture module by using the GPU hardware rendering layer.

In a possible implementation, the performing blurring processing on the downsampled image of the specified type to obtain a blurred image specifically includes: After obtaining the downsampled image, the blurry frame capture module performs blurring processing on the downsampled image to obtain the modulo image. The displaying the blurred image in the first preview box in a coverage manner specifically includes: The blurry frame capture module controls display of the blurred image in the first preview box in a coverage manner.

In a possible implementation, the cancelling display of the blurred image in the first preview box when a preview picture captured by the camera of the electronic device in the second photographing mode is obtained specifically includes: When obtaining the preview data in the second photographing mode, the camera hardware abstraction layer sends a mode switching completion instruction to the blurry frame capture module, where the preview data in the second photographing mode is used by the display control module to display, in the preview box, the preview picture captured in the second photographing mode, and the blurry frame capture module cancels, in response to the mode switching instruction, display of the blurred image in the preview box in a coverage manner.

In a possible implementation, the data type of the raw image is a YUV type, and the data type of the downsampled image is a bitmap bitmap type.

In a possible implementation, the first photographing mode is any one of the following: a normal video recording mode, a MACRO video recording mode, a NIGHT video recording mode, a PORTRAIT video recording mode, a high-dynamic video recording mode, a SOLO CUT video recording mode, and a multi-lens video recording mode. The second photographing mode is any one of the following: a normal video recording mode, a MACRO video recording mode, a NIGHT video recording mode, a PORTRAIT video recording mode, a high-dynamic video recording mode, a SOLO CUT video recording mode, and a multi-lens video recording mode.

According to a second aspect, this application provides an electronic device, including a camera, one or more processors, and one or more storages. The camera and the one or more storages are coupled to the one or more processors, the one or more storages are configured to store computer program code, and the computer program code includes computer instructions. When the one or more processors execute the computer instructions, the photographing mode switching method in any possible implementation of any one of the foregoing aspects is enabled to be performed.

According to a third aspect, this application provides an electronic device, including one or more functional modules. The one or more functional modules are configured to perform the photographing mode switching method in any possible implementation of any one of the foregoing aspects.

According to a fourth aspect, this application provides a chip system, including: the chip system is applied to an electronic device, and the chip system includes one or more processors. The processor is configured to invoke computer instructions to enable the photographing mode switching method in any possible implementation of any one of the foregoing aspects to be performed.

According to a fifth aspect, this application provides a computer-readable storage medium, including instructions. When the instructions are run on an electronic device, the photographing mode switching method in any possible implementation of any one of the foregoing aspects is enabled to be performed.

BRIEF DESCRIPTION OF DRAWINGS

FIG. 7 is a schematic flowchart of a photographing mode switching method according to an embodiment of this application.

DESCRIPTION OF EMBODIMENTS

The following clearly and completely describes the technical solutions in embodiments of this application with reference to the accompanying drawings. In descriptions of the embodiments of this application, unless otherwise stated, "/" indicates a meaning of "or", for example, A/B may indicate A or B. "And/or" in the specification is merely used to describe an association relationship between associated objects, and indicates that three relationships may exist. For example, "A and/or B" may indicate that there are three cases: Only A exists, both A and B exist, and only B exists. In addition, in the descriptions of the embodiments of this application, "a plurality of" means two or more.

The following terms "first" and "second" are merely intended for descriptive purposes, and shall not be understood as an implication or implication of relative importance or an implicit indication of a quantity of indicated technical features. Therefore, features defined with "first" and "second" may explicitly or implicitly include one or more features. In the descriptions of the embodiments of this application, unless otherwise stated, "a plurality of" means two or more.

Figure 1:
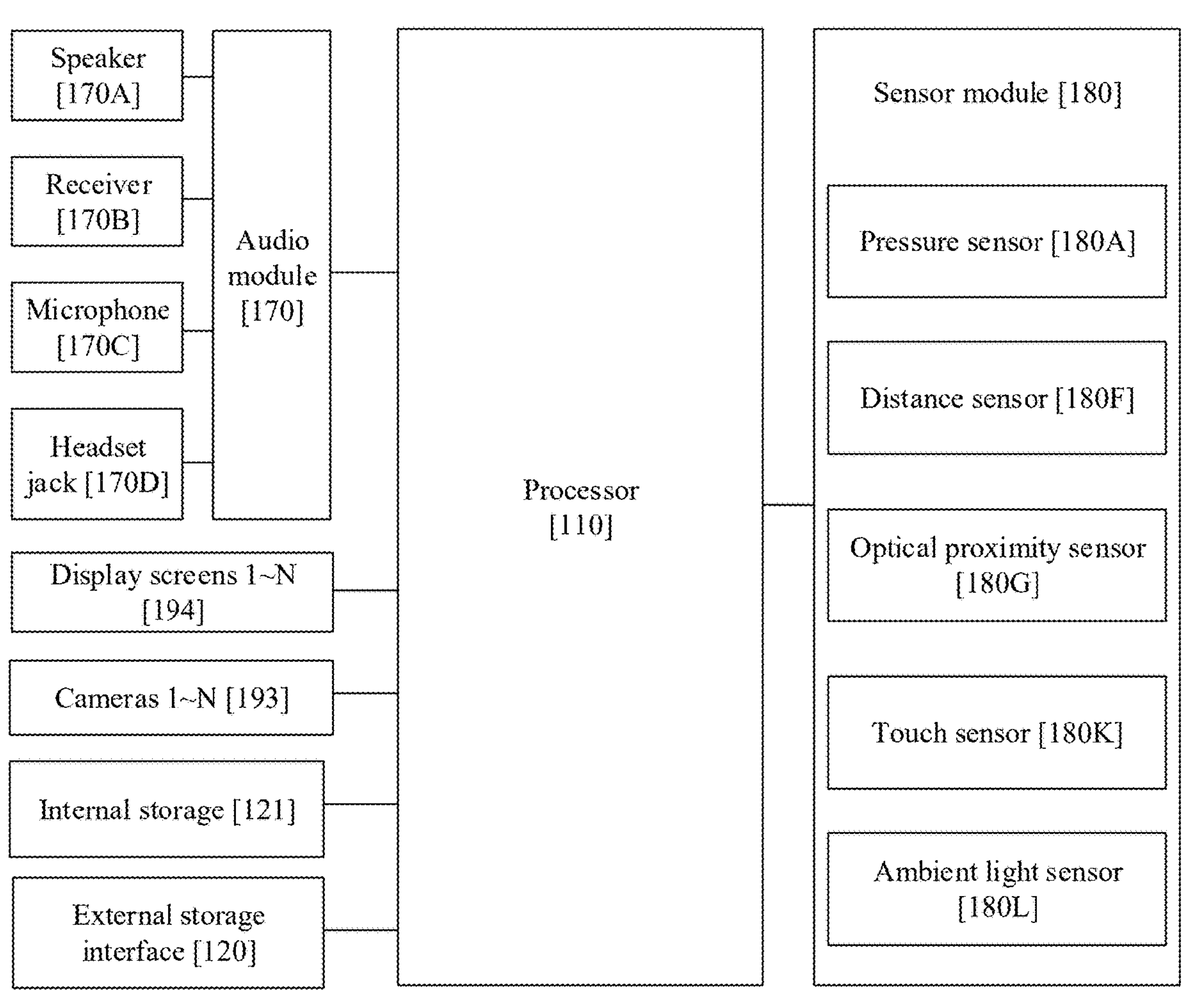
FIG. 1 is a schematic diagram of a hardware structure of an electronic device according to an embodiment of this application.

FIG. 1 is a schematic diagram of a hardware structure of an electronic device 100 according to an embodiment of this application.

The electronic device 100 may include a processor 110, an external storage interface 120, an internal storage 121, an audio module 170, a speaker 170A, a receiver 170B, a microphone 170C, a headset jack 170D, a sensor module 180, a camera 193, a display screen 194, and the like. The sensor module 180 may include a pressure sensor 180A, a distance sensor 180F, an optical proximity sensor 180G, a touch sensor 180K, an ambient light sensor 180L, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors. The controller may generate an operation control signal based on instruction operation code and a timing signal, to complete control of instruction fetching and instruction execution.

A storage may be further disposed in the processor 110, and is configured to store instructions and data. In some embodiments, the storage in the processor 110 is a cache. The storage may store instructions or data recently used or cyclically used by the processor 110. If the processor 110 needs to use the instructions or the data again, the processor may directly invoke the instructions or the data from the storage. This avoids repeated access and reduces waiting time of the processor 110, thereby improving system efficiency.

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change displayed information.

The display screen 194 is configured to display an image, a video, and the like. The display screen 194 includes a display panel. The display screen 194 includes a display panel. The display panel may be a liquid crystal display (liquid crystal display, LCD). The display panel may be further made from an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a miniled, a microled, a micro-oled, a quantum dot light emitting diode (quantum dot light emitting diodes, QLED), or the like. In some embodiments, the electronic device may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, and light is transferred to a photosensitive element of the camera through a lens. An optical signal is converted into an electrical signal. The photosensitive element of the camera transfers the electrical signal to the ISP for processing, to convert the electrical signal into an image visible to naked eyes. The ISP may further perform algorithm optimization on noise and illumination of the image. The ISP may further optimize parameters such as exposure and color temperature of a photographing scene. In some embodiments, the ISP may be disposed in the camera 193.

The camera 193 is configured to capture a still image or a video. An optical image of an object is generated through the lens and is projected onto the photosensitive element.

The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may further process another digital signal in addition to the digital image signal. For example, when the electronic device 100 selects a frequency, the digital signal processor is configured to perform Fourier transform and the like on frequency energy. The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG2, MPEG3, and MPEG4.

In this embodiment of this application, the electronic device 100 may record a video and/or take a photo by using photographing functions provided by the ISP, the camera 193, the video codec, the GPU, the display screen 194, and the application processor.

The internal storage 121 may include one or more random access memories (random access memory, RAM) and one or more non-volatile memories (non-volatile memory, NVM). The processor 110 may directly perform reading from or writing into the random access memory. The random access memory may be configured to store an executable program (for example, a machine instruction) of an operating system or another running program, and may be further configured to store data of a user and data of an application, and the like. The non-volatile memory may also store the executable program, the data of the user, and the data of the application, and the like, which may be loaded into the random access memory in advance for directly reading and writing by the processor 110.

Program code corresponding to the photographing mode recommendation method provided in the embodiments of this application may be stored in a non-volatile memory. In a scenario in which a camera application is running, the electronic device 100 may load the program code stored in the non-volatile memory into a random access memory, and then send the program code to the processor 110 for execution, to implement the photographing mode switching method.

The external storage interface 120 may be configured to connect to an external non-volatile memory, to extend a storage capability of the electronic device 100. The external non-volatile memory communicates with the processor 110 by using the external storage interface 120, to implement a data storage function. For example, files such as a video obtained through photographing are stored in the external non-volatile memory.

The electronic device 100 may implement an audio function by using the audio module 170, the application processor, and the like.

The audio module 170 is configured to convert digital audio information into an analog audio signal for output, and is further configured to convert an analog audio input into a digital audio signal. The audio module 170 may be further configured to encode and decode an audio signal. In some embodiments, the audio module 170 may be disposed in the processor 110 or some functional modules of the audio module 170 may be disposed in the processor 110.

Specifically, the audio module 170 may include the speaker 170A, the receiver 170B, the microphone 170C, and the headset jack 170D. The speaker 170A, also referred to as a "loudspeaker", is configured to convert an audio electrical signal into a sound signal. The receiver 170B, also referred to as an "earpiece", is configured to convert an audio electrical signal into a sound signal. In this embodiment of this application, after starting to record a video, the electronic device 100 may encode an audio electrical signal of the microphone 170C, and then obtain an audio track of the video. The microphone 170C, also referred to as a "mic" or "mike", is configured to convert a sound signal into an electrical signal. The headset jack 170D is configured to connect to a wired headset.

The pressure sensor 180A is configured to sense a pressure signal, and may convert the pressure signal into an electrical signal. In some embodiments, the pressure sensor 180A may be disposed on the display screen 194. When a touch operation is performed on the display screen 194, the electronic device 100 detects intensity of the touch operation based on the pressure sensor 180A. The electronic device 100 may also calculate a touch location based on a detected signal of the pressure sensor 180A.

The distance sensor 180F is configured to measure a distance. The electronic device 100 may measure a distance in an infrared manner or a laser manner. In some embodiments, in a photographing scene, the electronic device 100 may measure a distance by using the distance sensor 180F, to implement fast focusing. In this embodiment of this application, the electronic device 100 may determine an object distance of an image by using the distance sensor 180F The ambient light sensor 180L is configured to sense illumination of ambient light. In this embodiment of this application, the electronic device 100 may determine illumination of an image by using the ambient light sensor 180L.

The touch sensor 180K is also referred to as a "touch control device". The touch sensor 180K may be disposed on the display screen 194. The touch sensor 180K and the display screen 194 form a touchscreen, also referred to as a "touch control screen". The touch sensor 180K is configured to detect a touch operation performed on or near the touch sensor. The touch sensor may transfer the detected touch operation to the application processor to determine a type of a touch event. A visual output related to the touch operation may be provided by using the display screen 194. In some other embodiments, the touch sensor 180K may alternatively be disposed on a surface of the electronic device 100, at a location different from that of the display screen 194.

In this embodiment of this application, the electronic device 100 may detect, by using a touch detection capability provided by the touch sensor 180K, user operations such as tapping and sliding performed by a user on the screen, to control enabling and disabling of an application and a control.

The electronic device 100 may be a mobile phone having a camera, a digital camera, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart household device, and/or a smart city device. A specific type of the electronic device 100 is not specially limited in this embodiment of this application.

Figure 2:
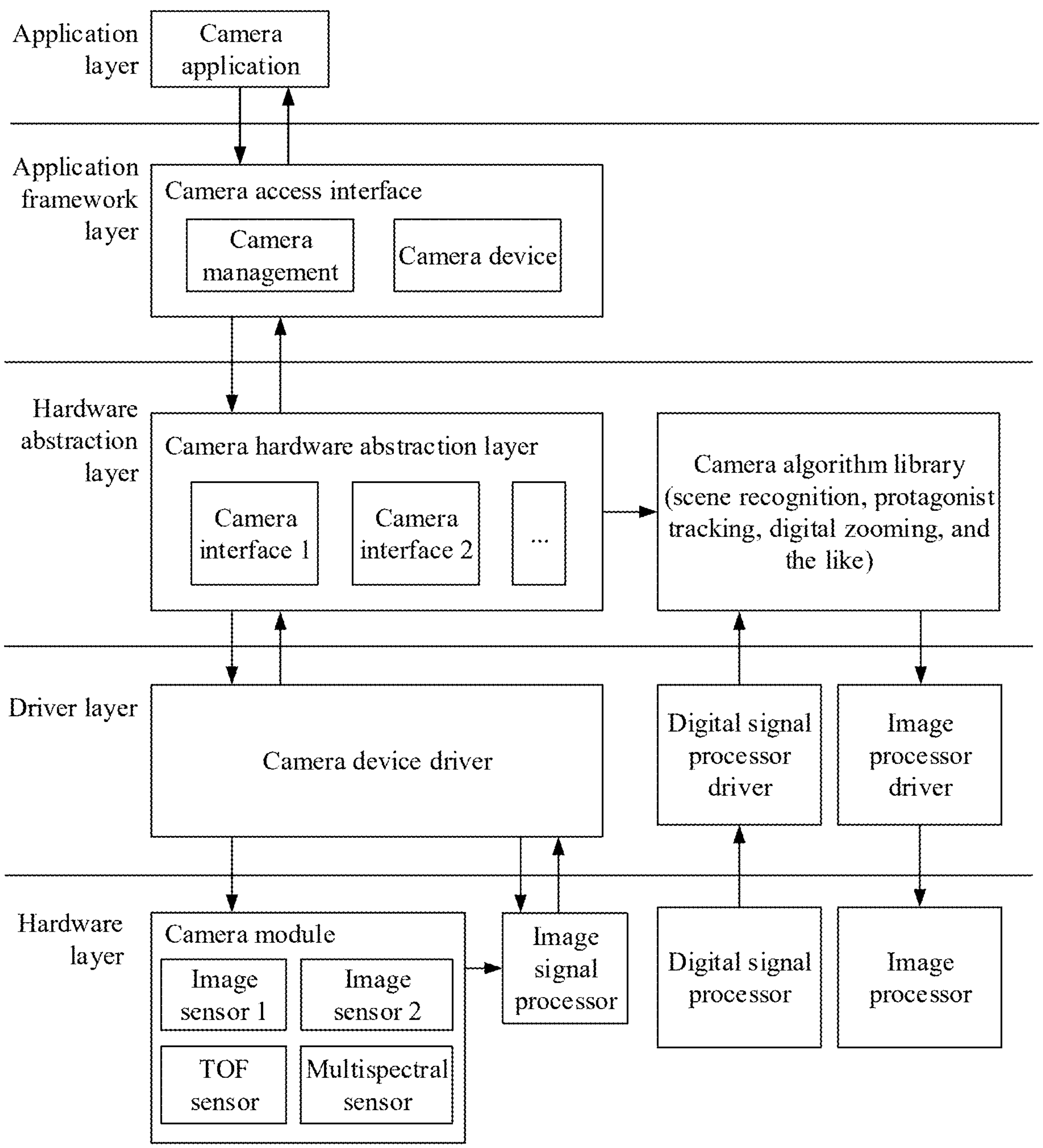
FIG. 2 is a schematic diagram of a software and hardware architecture of an electronic device according to an embodiment of this application.

FIG. 2 is an example of a schematic diagram of a software and hardware architecture of an electronic device according to an embodiment of this application.

As shown in FIG. 2, a layered architecture divides a system into several layers, and each layer has a clear role and task. The layers communicate with each other by using software interfaces. In some embodiments, the system is divided into five layers from top to bottom: an application layer, an application framework layer, a hardware abstraction layer, a driver layer, and a hardware layer.

The application layer may include a series of application packages.

The application package may include a camera application and the like.

The application framework layer provides an application programming interface (application programming interface, API) and a programming framework for the application package at the application layer. The application framework layer includes some predefined functions.

In some embodiments, the application framework layer may include a camera access interface. The camera access interface may include camera management and a camera device. The camera access interface is configured to provide an application programming interface and a programming framework for the camera application.

The hardware abstraction layer is an interface layer located between the application framework layer and the driver layer, and provides a virtual hardware platform for an operating system.

In this embodiment of this application, the hardware abstraction layer may include a camera hardware abstraction layer and a camera algorithm library.

The camera hardware abstraction layer may provide an interface for invoking one or more cameras. The interface for invoking one or more cameras includes a camera interface 1 (for example, a main camera), a camera interface 2 (for example, a wide-angle camera), and the like. The electronic device 100 may invoke each camera by using a camera interface such as the camera interface 1 or the camera interface 2.

The camera algorithm library may include one or more algorithm modules of an image processing/image recognition algorithm, for example, an algorithm module for scene recognition, an algorithm module for protagonist tracking, and an algorithm module for digital zooming.

The driver layer is a layer between hardware and software. The driver layer includes various hardware drivers. The driver layer may include a camera device driver, a digital signal processor driver, an image processor driver, and the like. The camera device driver is configured to drive an image sensor (for example, an image sensor 1, an image sensor 2, and the like) of one or more cameras in a camera module to capture an image, and drive an image signal processor to preprocess the image. The digital signal processor driver is configured to drive a digital signal processor to process the image. The image processor driver is configured to drive a graphics processing unit to process the image.

The hardware layer may include a camera module, an image signal processor, a digital signal processor, and an image processor. The camera module may include an image sensor (for example, an image sensor 1 and an image sensor 2) of one or more cameras. Optionally, the camera module may further include a time of flight (time of flight, TOF) sensor, a multispectral sensor, and the like.

The method in the embodiments of this application is described in detail below with reference to the foregoing hardware structure and system structure.

1. The electronic device 100 enables the camera to obtain an image reported by the camera.

In response to an operation (for example, a tap operation) performed by a user on an icon of the camera application, the camera application invokes the camera access interface at the application framework layer to start the camera application, and further sends, by invoking the camera interface 1 (which is usually a main camera by default) at the camera hardware abstraction layer, an instruction for starting the camera application. The camera hardware abstraction layer sends the instruction to the camera device driver at the driver layer. The camera device driver may start an image sensor (for example, the image sensor 1) corresponding to the camera interface 1, collect an image light signal by using the image sensor 1 and transmit the image light signal to the image signal processor for preprocessing to obtain an image, and then transmit the image to the camera hardware abstraction layer by using the camera device driver. Continuously generated images constitute an image stream.

2. The electronic device 100 determines, based on the image, a photographing scene in which the electronic device is currently located, and determines a photographing mode that matches the photographing scene.

In one aspect, the camera hardware abstraction layer may directly send the image back to the camera application for display.

In another aspect, the camera hardware abstraction layer may send the image to the camera algorithm library. Based on support of the digital signal processor and the image processor, the camera algorithm library may extract feature information of the image. The camera algorithm library may determine an object distance of the image by using a preset object distance detection algorithm, determine illumination of the image by using a preset illumination detection algorithm, determine exposure of the image by using a preset exposure detection algorithm, and recognize, by using a preset face detection algorithm and an animal recognition algorithm, whether the image includes a specific object such as a person, a cat, or a dog, a quantity of objects, an area ratio, and the like.

Then, the camera algorithm library may determine, based on the feature information of the image, a photographing scene in which the electronic device is currently located, and determine a photographing mode that matches the photographing scene. The camera algorithm library may set the matched photographing mode as a recommended mode. The camera algorithm library may send information about the recommended mode back to the camera application at the application layer.

The camera algorithm library may further include image processing algorithms corresponding to various photographing modes. After one or more photographing modes are selected, the camera algorithm library may invoke a corresponding image processing algorithm to process the image reported by the camera, and then upload a processed image back to the application layer for display.

3. The electronic device 100 updates content displayed on the screen, and recommends the photographing mode that matches the current photographing scene to the user.

In one aspect, the image reported by the camera is displayed in a specified region (for example, a preview box) of the screen of the camera application.

In another aspect, the camera application may manage each window in a user interface by using a window manager, and update content displayed in the window, for example, display/exit display of a mode recommendation control. In this way, the electronic device 100 may recommend, to the user in real time by using the foregoing mode recommendation control, the photographing mode that matches the current photographing scene.

The photographing mode switching method provided in the embodiments of this application is described below with reference to application scenarios.

In some application scenarios, a user may take a photo or record a video in a plurality of photographing modes in a camera application of an electronic device 100. Before taking a photo or recording a video, the user may switch between different photographing modes in the camera application to view effects of preview pictures in different photographing modes. In a process in which the electronic device 100 switches from a first photographing mode to a second photographing mode, the electronic device 100 may take out a raw image from a preview picture stream obtained in the first photographing mode, perform blurring processing on the raw image to obtain a blurred image, and display the blurred image in a preview box in a coverage manner in a photographing interface. In this way, a case that display of a preview picture is interrupted during photographing mode switching of the electronic device 100 can be avoided, thereby improving a picture preview effect achieved during photographing mode switching.

Figure 3A:
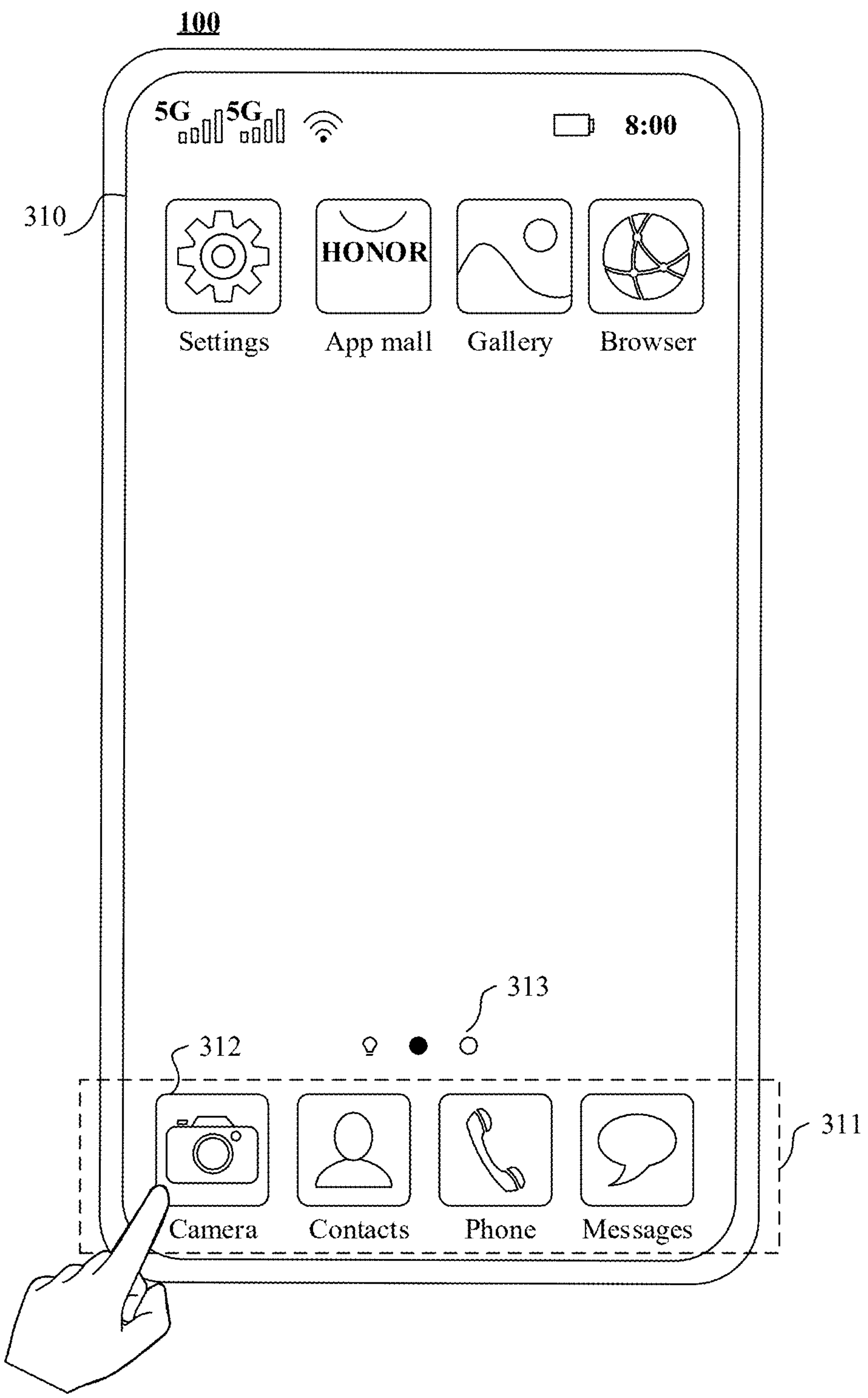
FIG. 3A-FIG. 3L are schematic diagrams of a group of user interfaces according to an embodiment of this application.

For example, as shown in FIG. 3A, the electronic device 100 may display a home screen 310. A page on which an application icon is placed is displayed on the home screen 310. The page includes a plurality of application icons (for example, a settings application icon, an App mall icon, a gallery application icon, and a browser application icon). A page indicator 313 may be further displayed and included below the plurality of application icons, to indicate a location relationship between the currently displayed page and another page. A tray region 311 is displayed below the page indicator 313. The tray region 311 includes a plurality of tray icons, for example, a camera application icon 312, a contacts application icon, a phone application icon, and a messages application icon. The tray region 311 remains displayed during page switching. In some embodiments, the page may alternatively include a plurality of application icons and the page indicator 313. The page indicator 313 may not be a part of the page, and may exist alone. The tray icon is also optional. This is not limited in this embodiment of this application.

The electronic device 100 may receive an input (for example, a tap) performed by the user on the camera application icon 312. In response to the input operation, the electronic device 100 may display a photographing interface 320 shown in FIG. 3B.

Figure 3B:
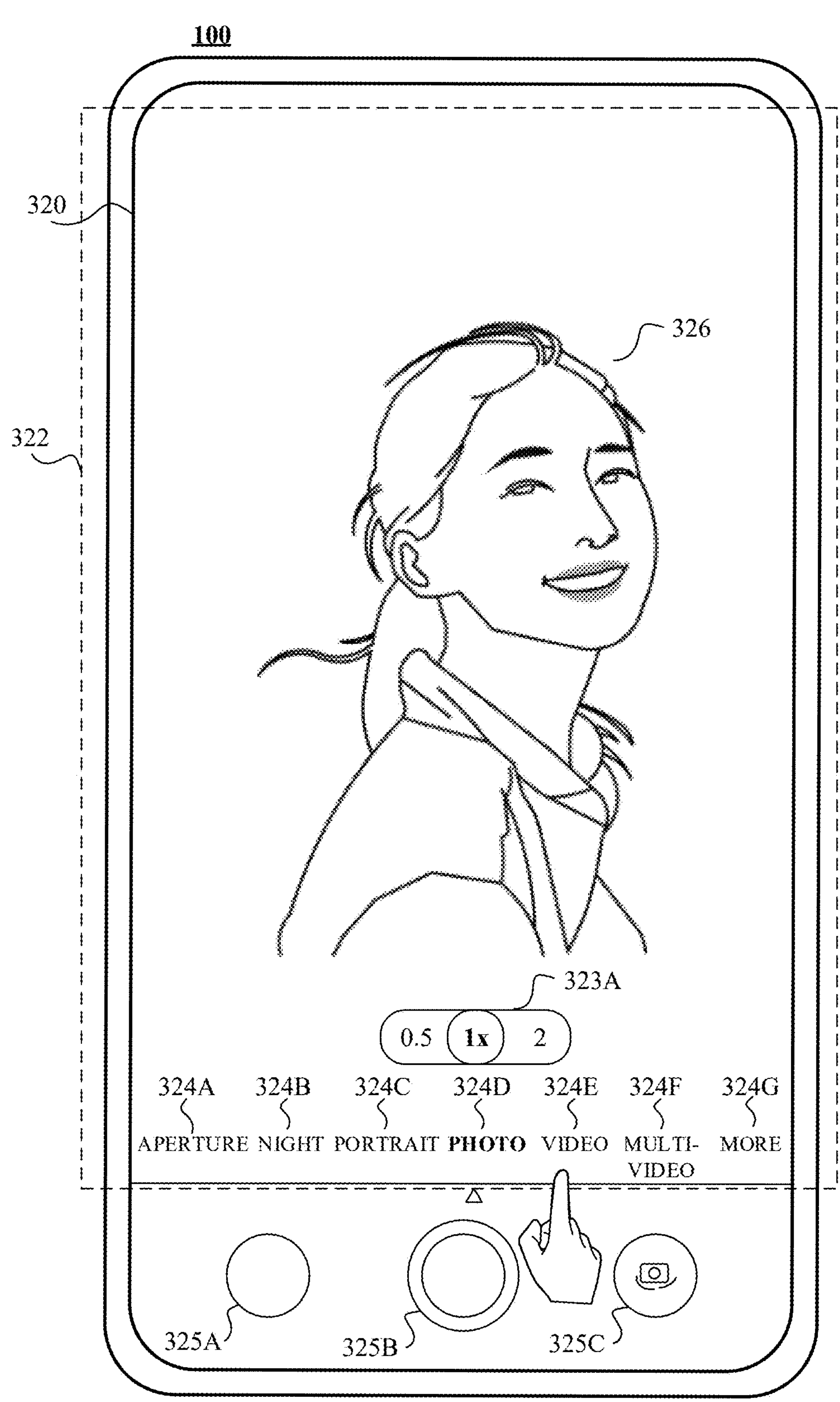

As shown in FIG. 3B, the photographing interface 320 may include an echo control 325A, a photographing control 325B, a camera conversion control 325C, a preview box 322, and a zoom ratio control 323A. As shown in FIG. 3B, a control 324D of a normal photographing mode is selected, and the electronic device 100 is in the normal photographing mode. The preview box 322 displays a preview picture 326 captured by the electronic device 100 in the normal photographing mode by using a camera. The echo control 325A may be configured to trigger display of a captured image or a shot video. The photographing control 325B is configured to trigger storage of an image captured by the camera. The camera conversion control 325C may be configured to switch a camera for capturing an image by the electronic device 100 (for example, switch a front-facing camera to a rear-facing camera or switch a rear-facing camera to a front-facing camera). The zoom ratio control 323A may be configured to set a zoom magnification used by the electronic device 100 to take a photo or shoot a video. A control of a photographing mode may be configured to trigger enabling of an image processing procedure corresponding to the photographing mode. For example, a control 324A of the APERTURE photographing mode may be configured to trigger the camera to capture an image by using an aperture parameter. For example, a control 324B of a NIGHT photographing mode may be configured to trigger an increase in brightness and color richness and like in a captured image. A control 324C of a PORTRAIT photographing mode may be configured to trigger the electronic device 100 to beautify a portrait in a captured image. The control 324D of the normal photographing mode may be configured to trigger the electronic device 100 to capture an image by using a default parameter, and process, by using a default image processing procedure, an image captured by the camera. A control 324E of a normal video recording mode may be configured to trigger the electronic device 100 to record a video by using a single camera. A control 324F of a multi-lens video recording mode may be configured to trigger the electronic device 100 to simultaneously record a video by using a plurality of cameras. A more control 324G may be configured to trigger the electronic device 100 to display controls of more photographing modes.

The electronic device 100 may receive an input (for example, a tap) of selecting the control 324E of the normal video recording mode by the user. In response to the input, the electronic device 100 may switch from the normal photographing mode to the normal video recording mode, and generate a blurred image 327 based on an image captured by the camera in the normal photographing mode.

Figure 3C:
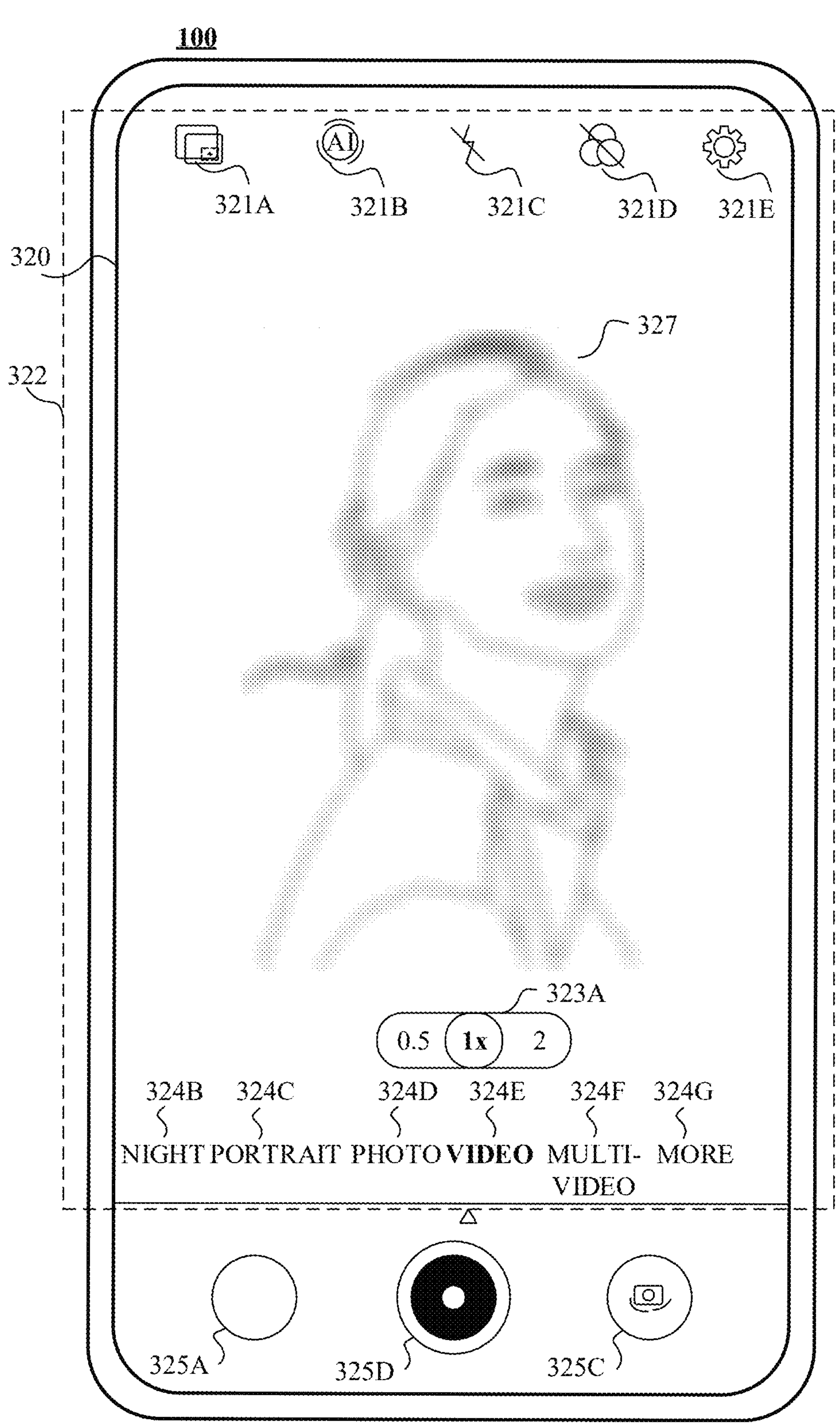

As shown in FIG. 3C, in a process in which the electronic device 100 switches from the normal photographing mode to the normal video recording mode, the electronic device 100 may display the blurred image 327 in the preview box 322 in a coverage manner. The electronic device 100 may switch from the normal photographing mode to the normal video recording mode, and replace the photographing control 325B with a recording start control 325D. After switching to the normal video recording mode, the electronic device 100 may display one or more function controls (for example, a control 321A of a SOLO CUT video recording mode, an AI scene recognition control 321B, a flash control 321C, a color mode control 321D, and a setting control 321E) in the photographing interface 320. The control 321A of the SOLO CUT video recording mode may be configured to trigger, when being enabled, the electronic device 100 to recognize a protagonist in a plurality of people in a preview picture. The AI scene recognition control 321B may be configured to trigger, when being enabled, the electronic device 100 to recognize a photographing scene in a preview picture, and the AI scene recognition control 321B is currently in an enabled state. The flash control 321C may be configured to trigger the electronic device 100 to enable or disable a flash. The color mode control 321D may be configured to trigger the electronic device 100 to use a color filter to process an image captured by the camera. The setting control 321E may be configured to set a photographing parameter (for example, an image size and an image storage format) of the electronic device 100. The control 321A of the SOLO CUT video recording mode may be configured to trigger, when being enabled, the electronic device 100 to recognize a protagonist in a plurality of people in a preview picture. The AI scene recognition control 321B may be configured to trigger, when being enabled, the electronic device 100 to recognize a photographing scene in a preview picture, and the AI scene recognition control 321B is currently in an enabled state. The flash control 321C may be configured to trigger the electronic device 100 to enable or disable a flash. The color mode control 321D may be configured to trigger the electronic device 100 to use a color filter to process an image captured by the camera. The setting control 321E may be configured to set a photographing parameter (for example, an image size and an image storage format) of the electronic device 100.

Figure 3D:
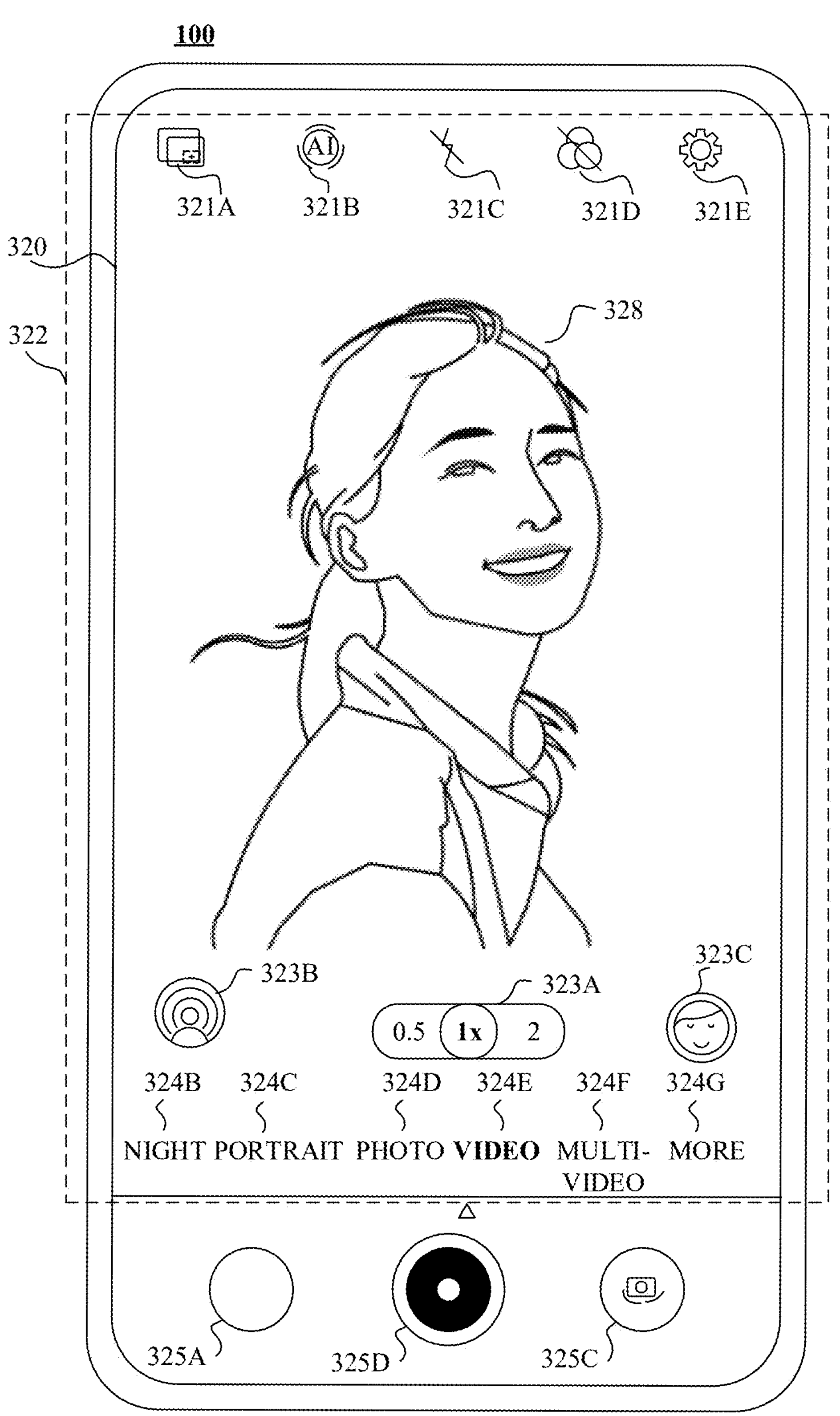

As shown in FIG. 3D, after the electronic device 100 switches to the normal video recording mode, the electronic device 100 may cancel display of the blurred image 327, and display, in the preview box 322, a preview picture 328 obtained in real time by the camera in the normal video recording mode. Optionally, after switching to the normal video recording mode, the electronic device 100 may display one or more function controls related to video recording, for example, a background blurring control 323B and a beauty control 323C. The background blurring control 323B may be configured to set a background blurring degree in a preview picture and a captured picture. The beauty control 323C may be configured to set a beautification degree of a face color in a preview picture and a captured picture.

Figure 3E:
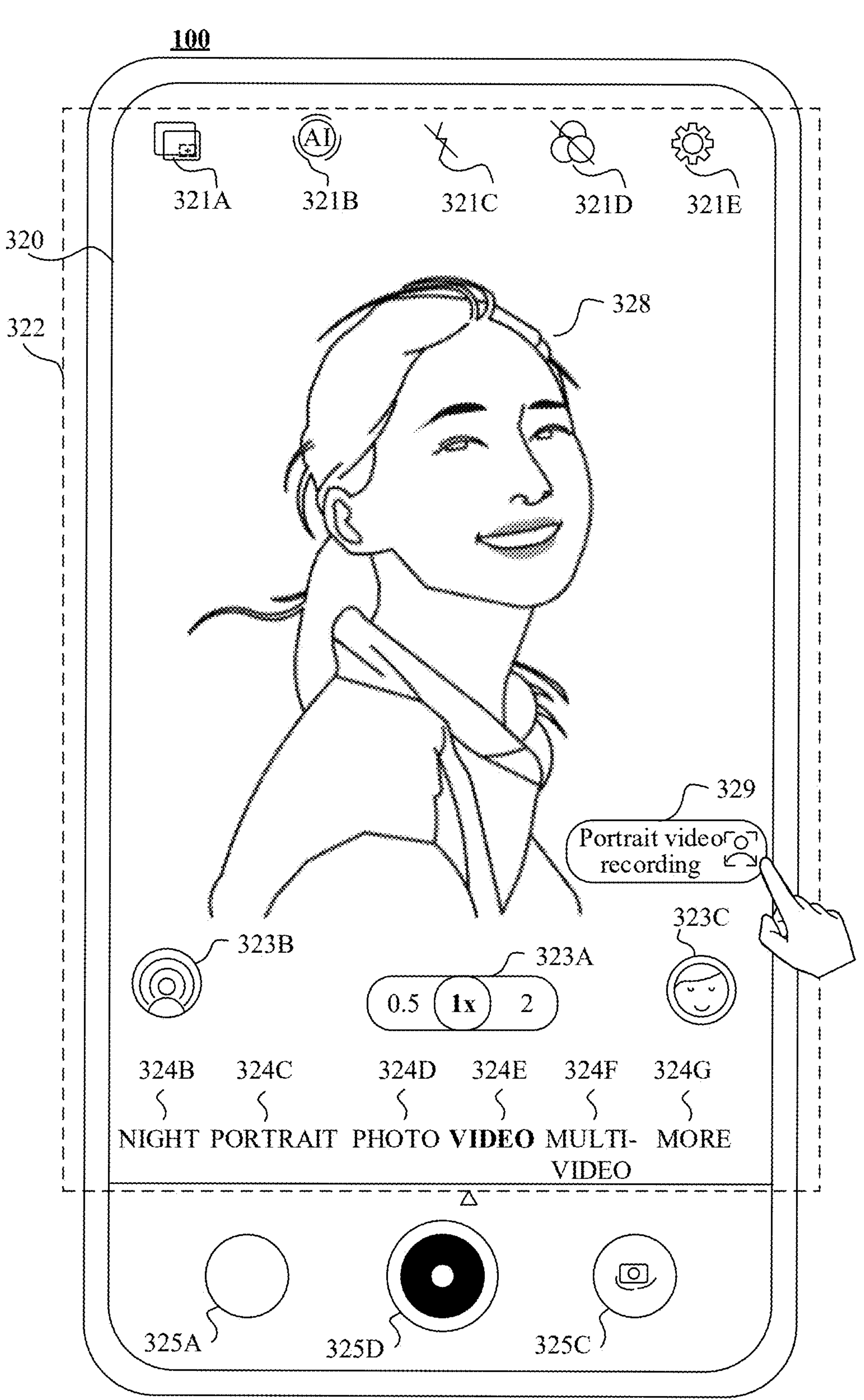

As shown in FIG. 3E, because the electronic device 100 enables the AI scene recognition function, the electronic device 100 may recognize that the preview picture 328 includes a portrait. Therefore, the electronic device 100 may display a control 329 of a PORTRAIT video recording mode. After the control 329 is enabled, if the electronic device 100 starts to record a video, the electronic device 100 may record the video by using a photographing parameter and an image processing procedure in the PORTRAIT video recording mode. For example, a background region other than a portrait in a video picture is blurred to highlight a portrait feature. The AI scene recognition function may be enabled by default when the electronic device enters the normal video recording mode.

In a possible implementation, the AI scene recognition function may be disabled by default when the electronic device enters the normal video recording mode. The electronic device 100 may receive an input performed by the user on the AI scene recognition control 321B in a disabled state, and respond to the input to switch the AI scene recognition control 321B to an enabled state, and enable the AI scene recognition function.

Figure 3F:
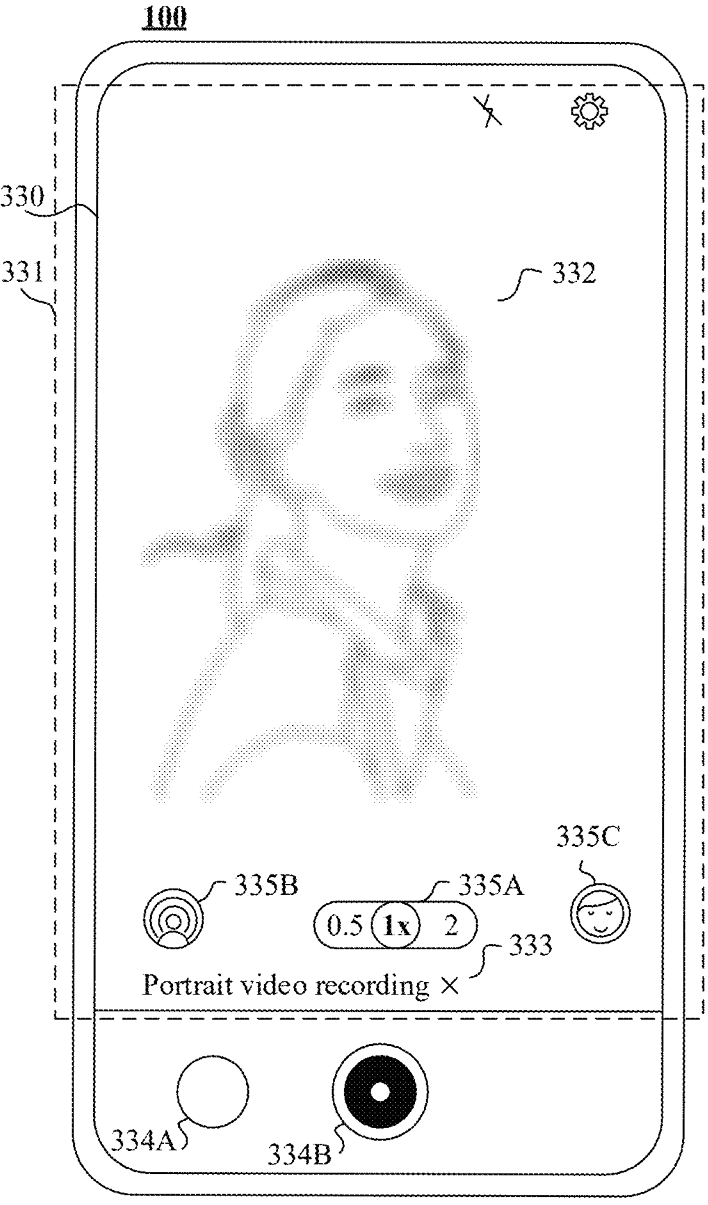

The electronic device 100 may receive an input performed by the user on the control 329 of the PORTRAIT video recording mode, and respond to the input to generate a blurred image 332 based on an image captured by the camera in the normal video recording mode, switch from the normal video recording mode to the PORTRAIT video recording mode, and display a portrait video recording interface 330 shown in FIG. 3F.

As shown in FIG. 3F, the portrait video recording interface 330 may include a preview box 331, a disable control 333, an echo control 334A, a recording start control 334B, and the like. In a process in which the electronic device 100 switches from the normal video recording mode to the PORTRAIT video recording mode, the electronic device 100 may display the blurred image 332 in the preview box 322. The echo control 334A may be configured to trigger display of a captured image or a shot video. The recording start control 334B is configured to trigger the electronic device 100 to start to video recording in the PORTRAIT video recording mode. The disable control 333 may be configured to trigger the electronic device 100 to exit the PORTRAIT video recording mode. Optionally, after the electronic device 100 switches to the PORTRAIT video recording mode, the electronic device 100 may display, in the portrait video recording interface 330, one or more function controls related to video recording, for example a zoom ratio control 335A, a background blurring control 335B, and a beauty control 335C. The zoom ratio control 335A may be configured to set a zoom magnification of the electronic device 100 in the PORTRAIT video recording mode. The background blurring control 335B may be configured to set a background blurring degree in a preview picture and a video picture. The beauty control 335C may be configured to set a beautification degree of a face color in a preview picture and a video picture.

Figure 3G:
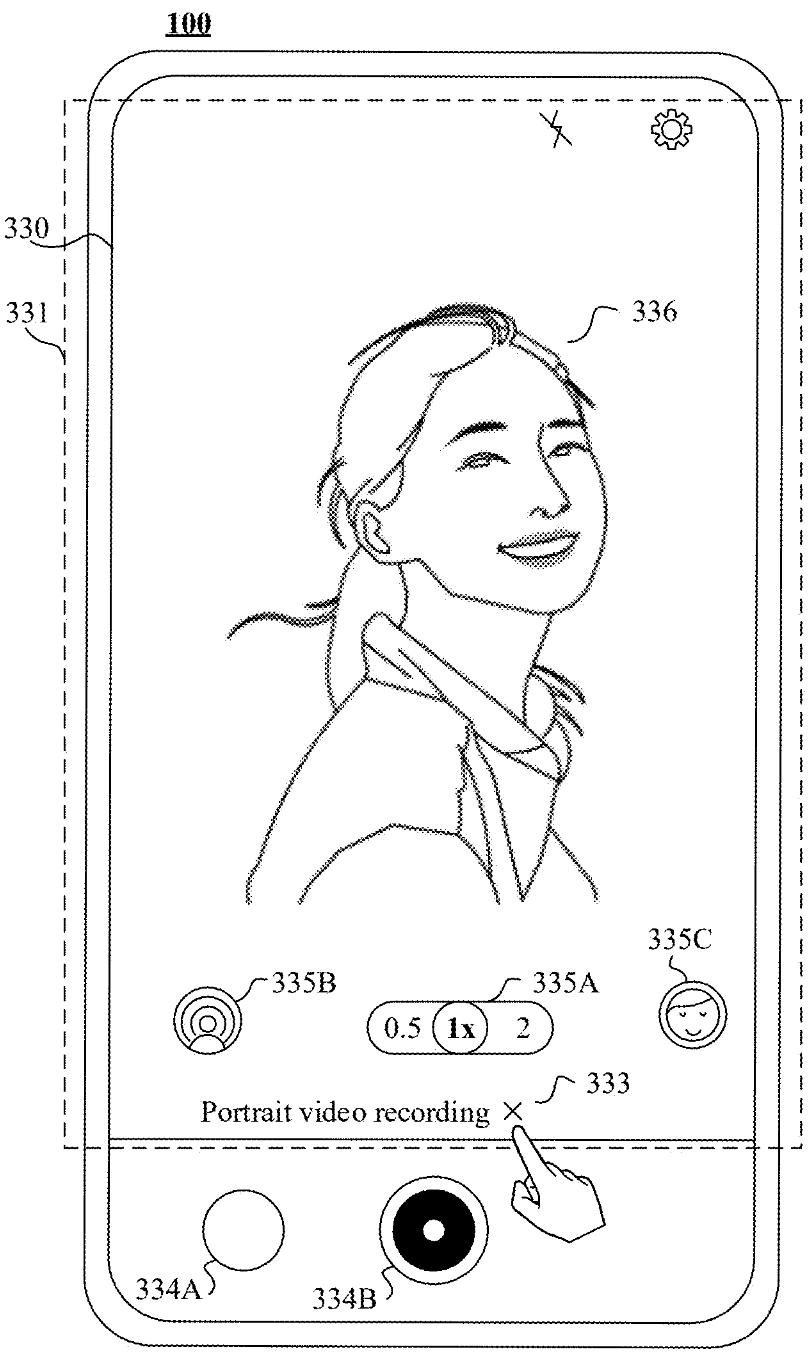

As shown in FIG. 3G, after the electronic device 100 switches from the normal video recording mode to the PORTRAIT video recording mode, the electronic device 100 may capture an image in real time by using the photographing parameter in the PORTRAIT video recording mode, and process, by using the image processing procedure in the PORTRAIT video recording mode, the image captured in real time, to obtain a real-time preview picture 336. After the electronic device 100 obtains the real-time preview picture 336, the electronic device 100 may cancel display of the blurred image 332, and display the real-time preview picture 336 in the preview box 331.

The electronic device 100 may receive an input (for example, a tap) performed by the user on the disable control 333. In response to the input, the electronic device 100 may generate a blurred image 337 based on the image captured by the camera in the PORTRAIT video recording mode, switch from the normal video recording mode to the PORTRAIT video recording mode, and display the photographing interface 320 shown in FIG. 3H.

Figure 3H:
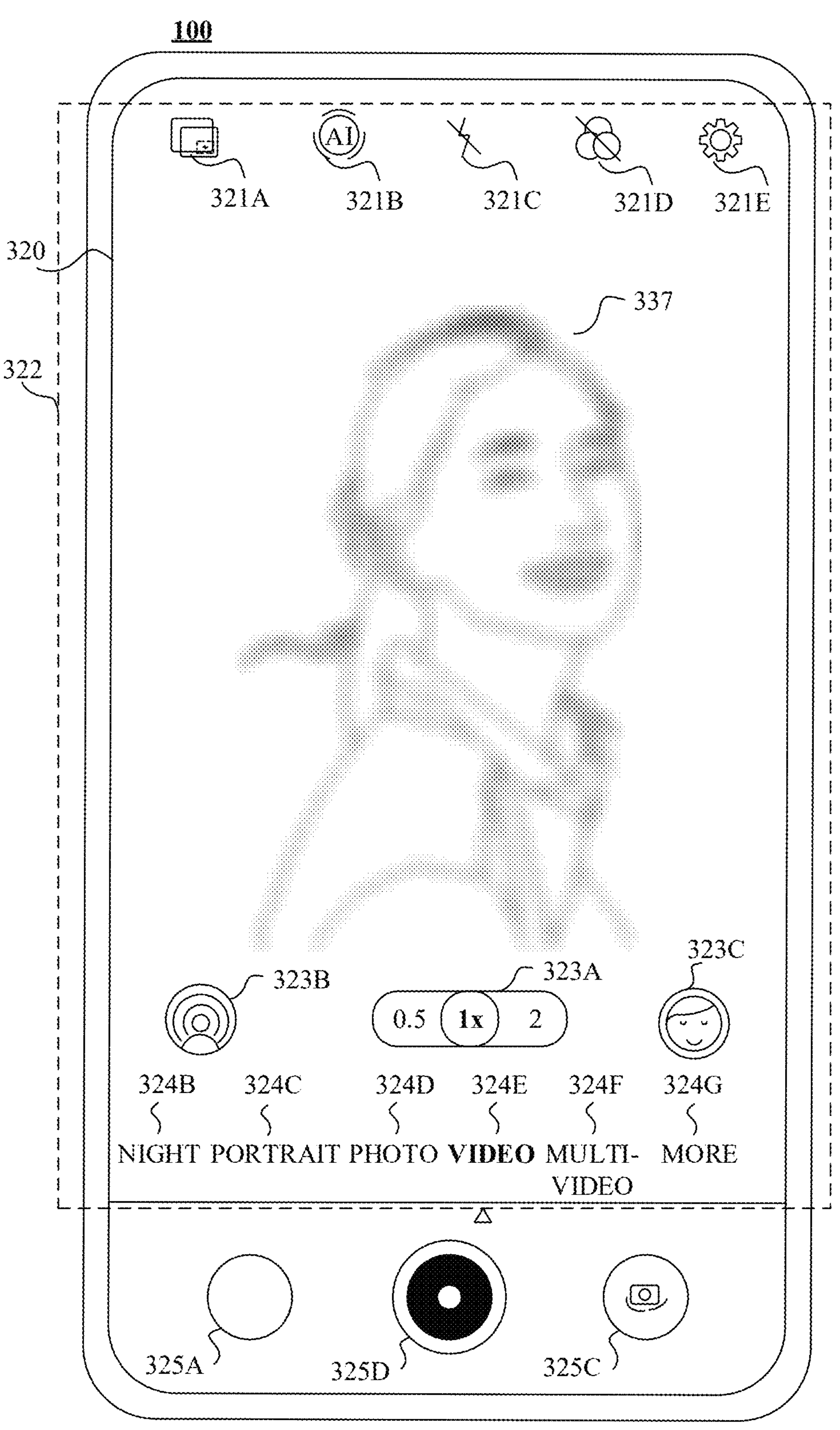

As shown in FIG. 3H, in a process in which the electronic device 100 switches from the PORTRAIT video recording mode to the normal video recording mode, the electronic device 100 may display the blurred image 337 in the preview box 322 in the photographing interface 320. For text descriptions of other controls in the photographing interface 320, refer to text parts in the foregoing embodiments shown in FIG. 3C and FIG. 3D. Details are not described herein again.

Figure 3I:
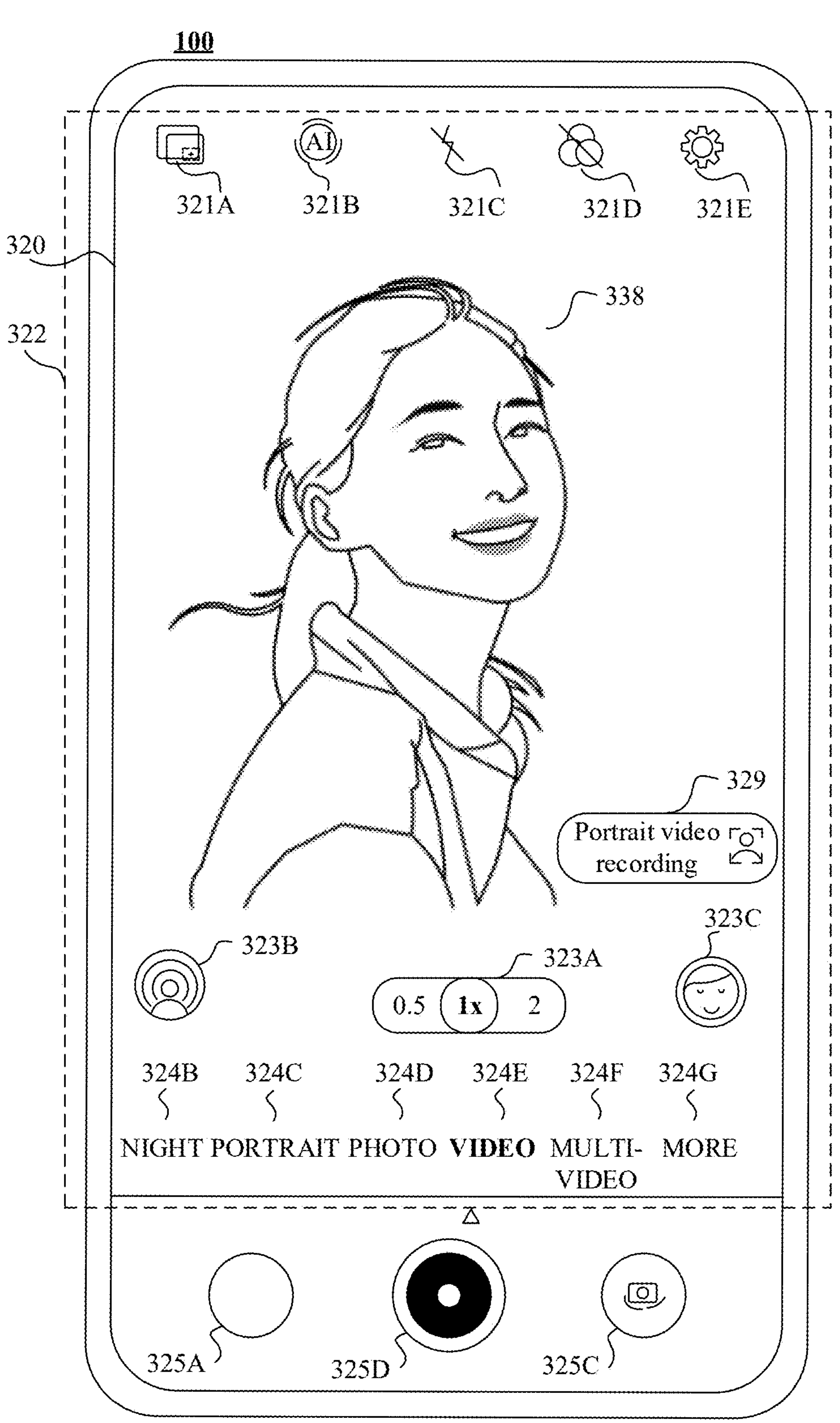

As shown in FIG. 3I, after the electronic device 100 switches to the normal video recording mode, the electronic device 100 may capture an image in real time by using a photographing parameter in the normal video recording mode, and process, by using an image processing procedure in the normal video recording mode, the image captured in real time to obtain a real-time preview picture 338. After the electronic device 100 obtains the real-time preview picture 338, the electronic device 100 may cancel display of the blurred image 337, and display the real-time preview picture 338 in the preview box 322. After the electronic device 100 switches to the normal video recording mode, because the electronic device 100 recognizes, from the real-time preview picture 338, that the preview picture includes a portrait, the electronic device 100 may display the foregoing control 329 of the PORTRAIT video recording mode. For a text description of the control 329, refer to the embodiment shown in FIG. 3E. Details are not described herein again.

Figure 3J:
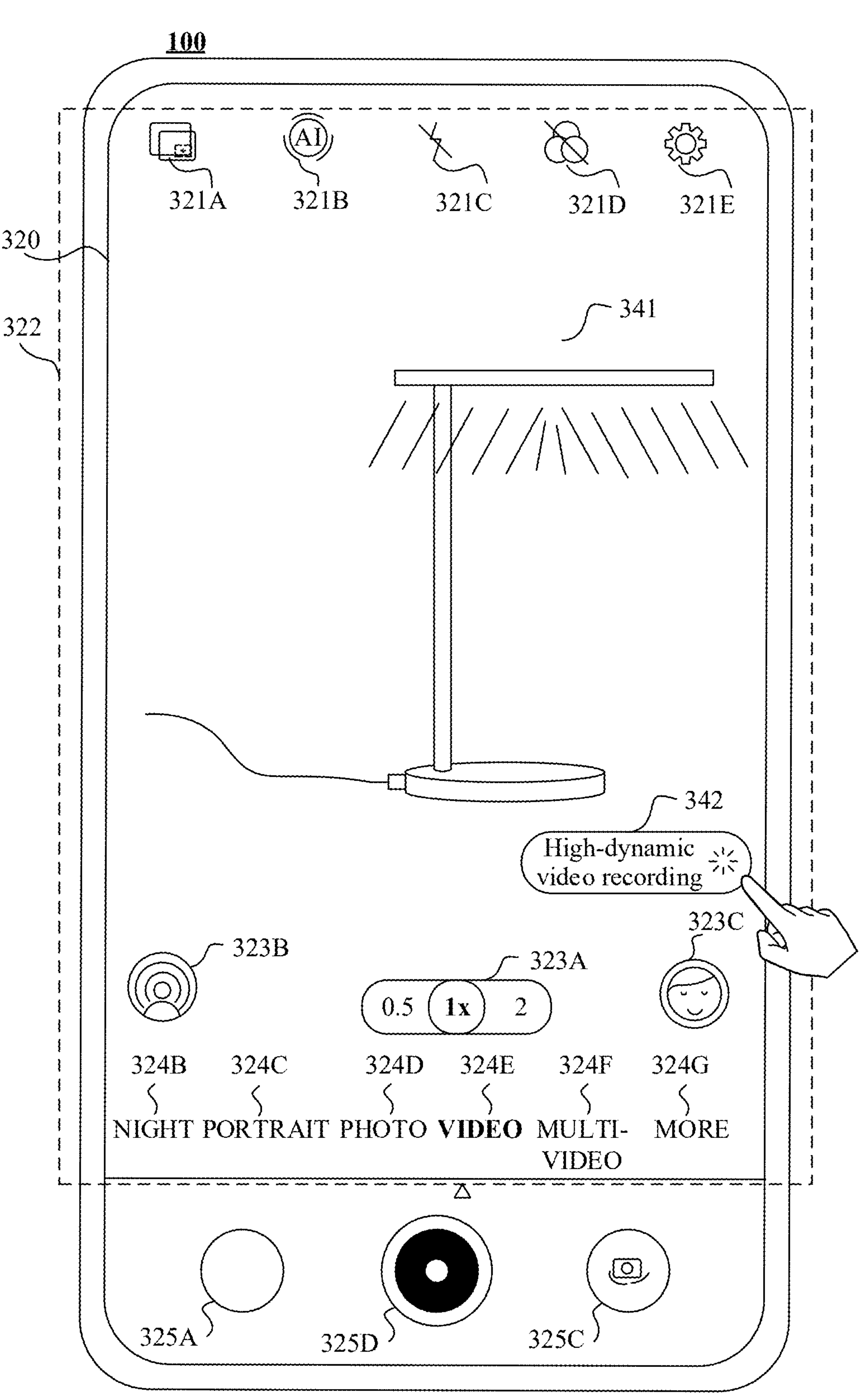

As shown in FIG. 3J, the electronic device 100 may display, in the preview box 322 in the photographing interface 320, a preview picture 341 captured by the camera in real time. Because the electronic device 100 enables the AI scene recognition function, the electronic device 100 may recognize that a high-dynamic video recording condition (for example, exposure is greater than a preset value) is met in the preview picture 341. Therefore, the electronic device 100 may display a control 342 of a high-dynamic video recording mode. After the control 342 is enabled, if the electronic device 100 starts to record a video, the electronic device 100 may record the video by using a photographing parameter and an image processing procedure in the high-dynamic video recording mode.

Figure 3K:
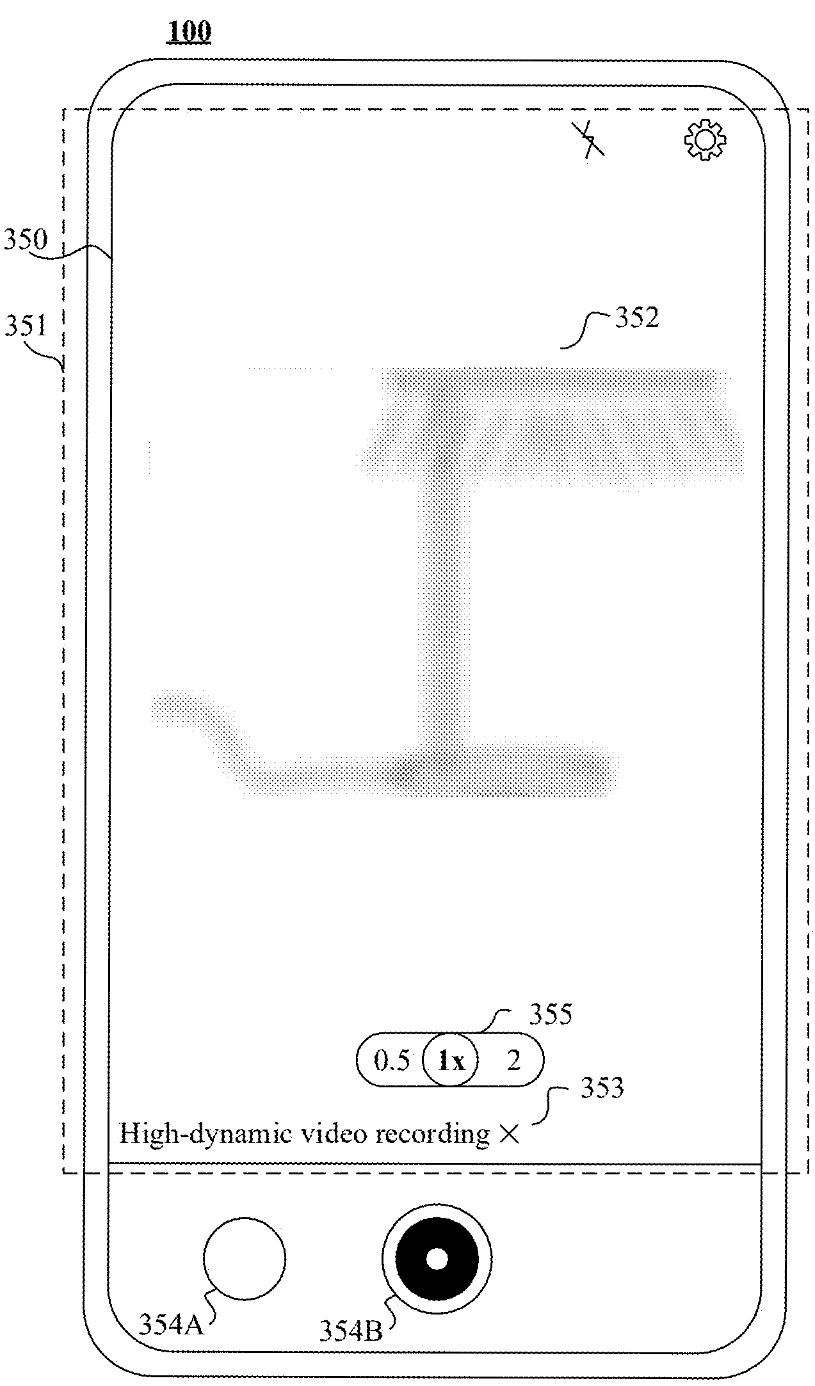

The electronic device 100 may receive an input performed by the user on the control 342 of the high-dynamic video recording mode, and respond to the input to generate a blurred image 352 based on an image captured by the camera in the normal video recording mode, switch from the normal video recording mode to the high-dynamic video recording mode, and display a high-dynamic video recording interface 350 shown in FIG. 3K.

As shown in FIG. 3K, the high-dynamic video recording interface 350 may include a preview box 351, a disable control 353, an echo control 354A, a recording start control 354B, and the like. In a process in which the electronic device 100 switches from the normal video recording mode to the high-dynamic video recording mode, the electronic device 100 may display the blurred image 352 in the preview box 351. The echo control 354A may be configured to trigger display of a captured image or a shot video. The recording start control 354B is configured to trigger the electronic device 100 to start video recording in the high-dynamic video recording mode. The disable control 353 may be configured to trigger the electronic device 100 to exit the high-dynamic video recording mode. Optionally, after the electronic device 100 switches to the high-dynamic video recording mode, the electronic device 100 may display, in the high-dynamic video recording interface 350, one or more function controls related to video recording, for example, the zoom ratio control 355. The zoom ratio control 355 may be configured to set a zoom ratio of the electronic device 100 in the high-dynamic video recording mode.

Figure 3L:
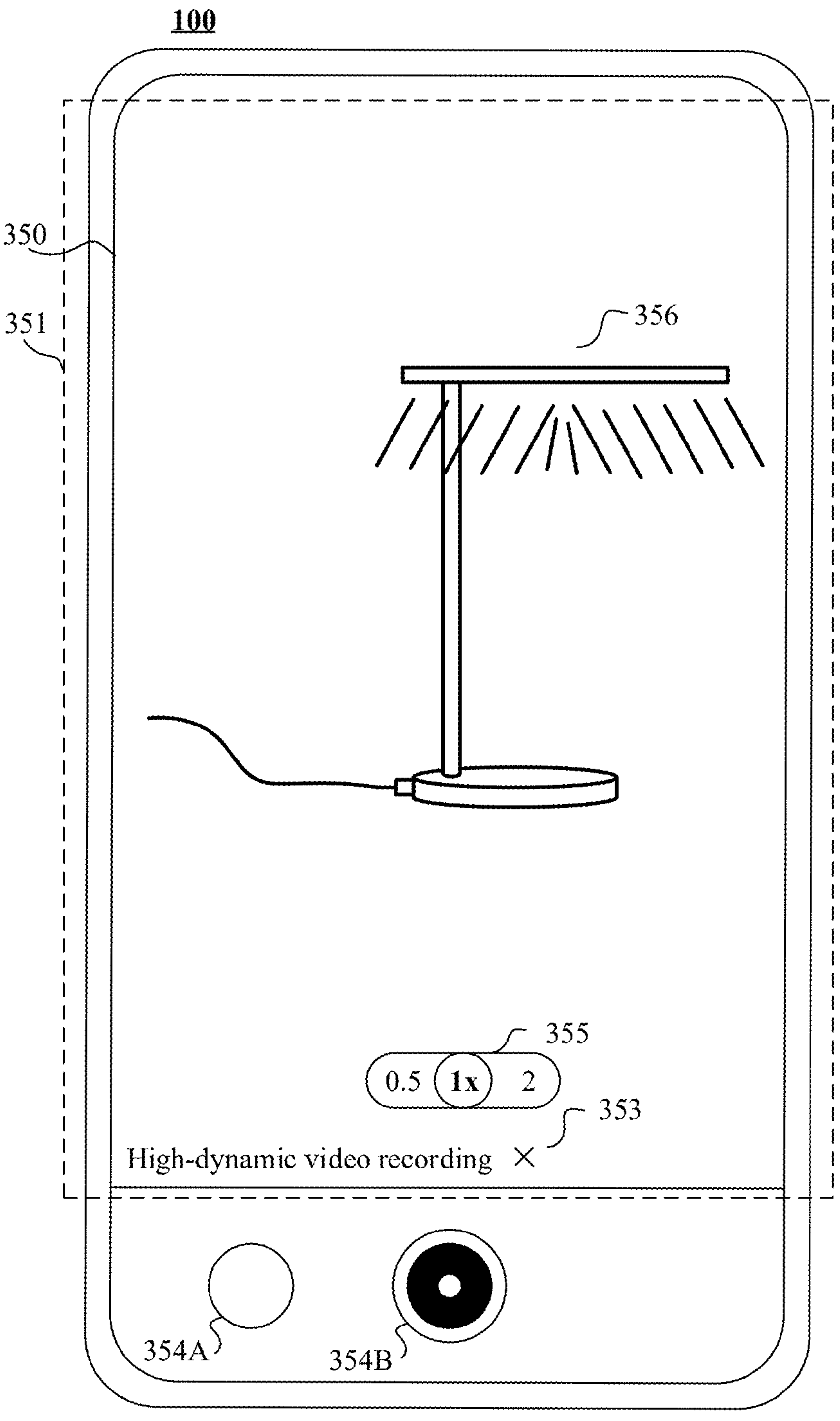

As shown in FIG. 3L, after the electronic device 100 switches from the normal video recording mode to the high-dynamic video recording mode, the electronic device 100 may capture an image in real time by using the photographing parameter in the high-dynamic video recording mode, and process, by using the image processing procedure in the high-dynamic video recording mode, the image captured in real time, to obtain a real-time preview picture 356. After the electronic device 100 obtains the real-time preview picture 356, the electronic device 100 may cancel display of the blurred image 352, and display the real-time preview picture 356 in the preview box 351.

In some embodiments, a user may use, through switching, different cameras on an electronic device 100 to take a photo or record a video. Before taking a photo or recording a video, the user may switch between different cameras in a camera application to view effects of preview pictures in different cameras. In a process in which the electronic device 100 switches from a first camera to a second camera, the electronic device 100 may take out a raw image from a preview picture stream obtained in the first camera, perform blurring processing on the raw image to obtain a blurred image, and display the blurred image in a preview box in a photographing interface. In this way, a case that display of a preview picture is interrupted during camera switching of the electronic device 100 can be avoided, thereby improving a picture preview effect achieved during photographing mode switching.

Figure 4A:
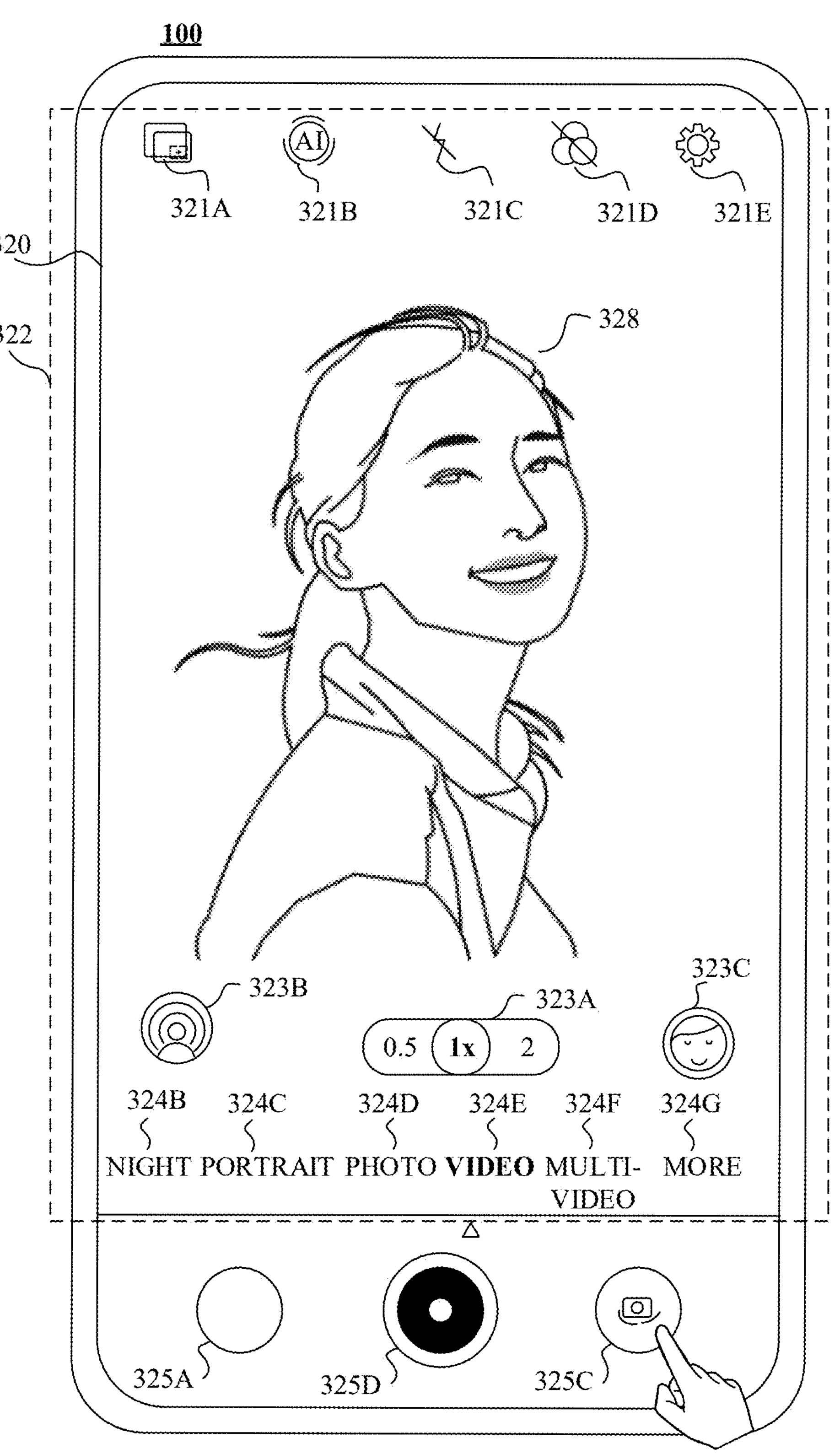
FIG. 4A-FIG. 4C are schematic diagrams of another group of user interfaces according to an embodiment of this application.

For example, as shown in FIG. 4A, the electronic device 100 may display a photographing interface 320. The photographing interface 320 may include an echo control 325A, a recording start control 325D, a camera conversion control 325C, a preview box 322, a zoom ratio control 323A, a control of one or more photographing modes (for example, a control 324A of an APERTURE photographing mode, a control 324B of a NIGHT photographing mode, a control 324C of a PORTRAIT photographing mode, a control 324D of a normal photographing mode, a control 324E of a normal video recording mode, a control 324F of a multi-lens video recording mode, and a more mode control 324G), and one or more function controls (for example, a control 321 A of a SOLO CUT video recording mode, an AI scene recognition control 321B, a flash control 321C, a color mode control 321D, and a setting control 321E). As shown in FIG. 4A, the control 324E of the normal video recording mode is selected, and the electronic device 100 is in the normal video recording mode. The preview box 322 displays a preview picture 328 obtained in real time by using the first camera in the normal video recording mode.

The electronic device 100 may receive an input (for example, a tap) performed by the user on the camera conversion control 325C. In response to the input, the electronic device 100 may generate a blurred image 411 based on the image obtained by the first camera in the normal video recording mode, and capture an image in real time by using the second camera in the normal video recording mode.

Figure 4B:
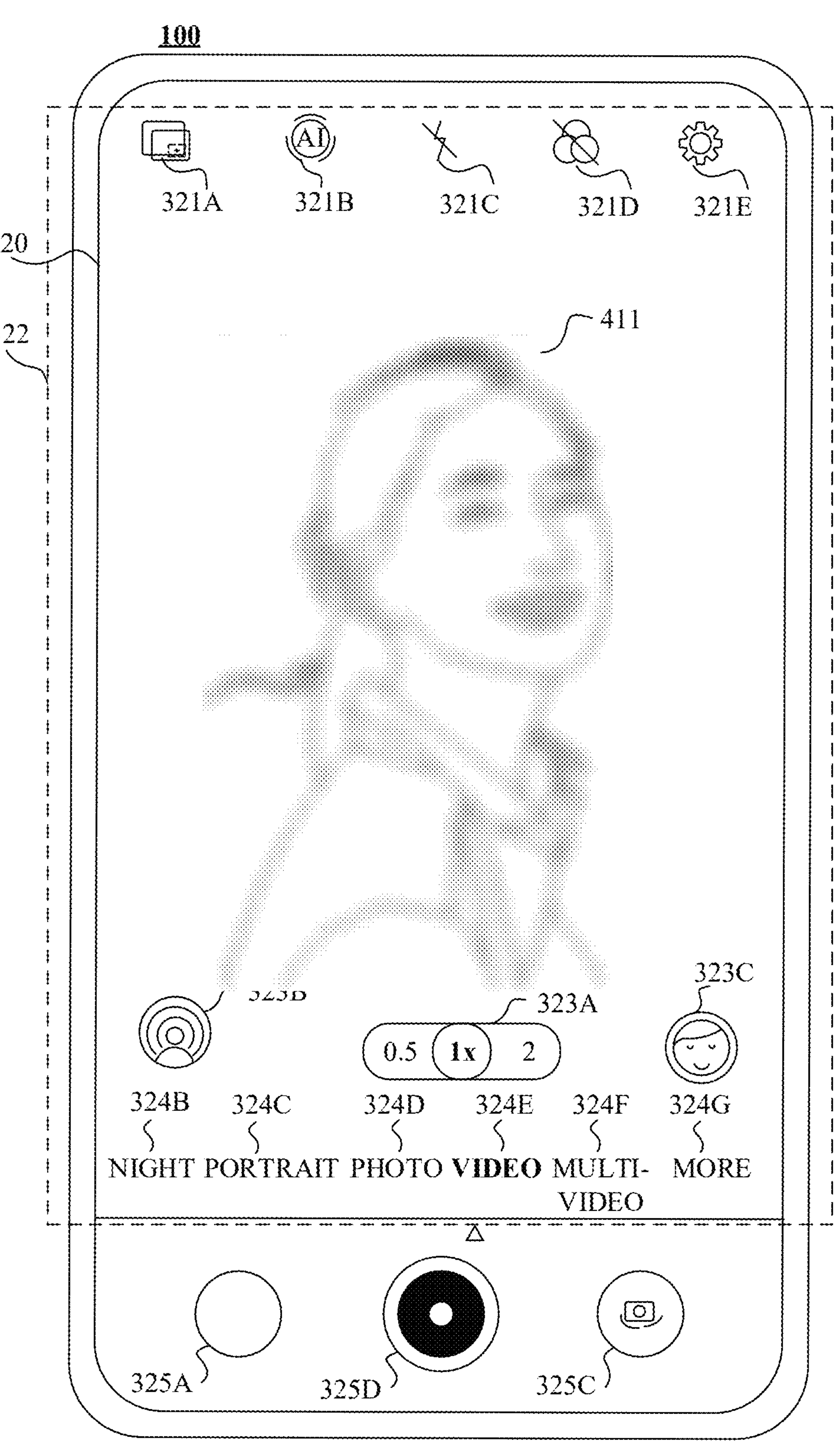

As shown in FIG. 4B, in a process in which a camera for capturing an image in real time by the electronic device 100 in the normal video recording mode is switched from the first camera to the second camera, the electronic device 100 may display the blurred image 411 in the preview box 322.

Figure 4C:
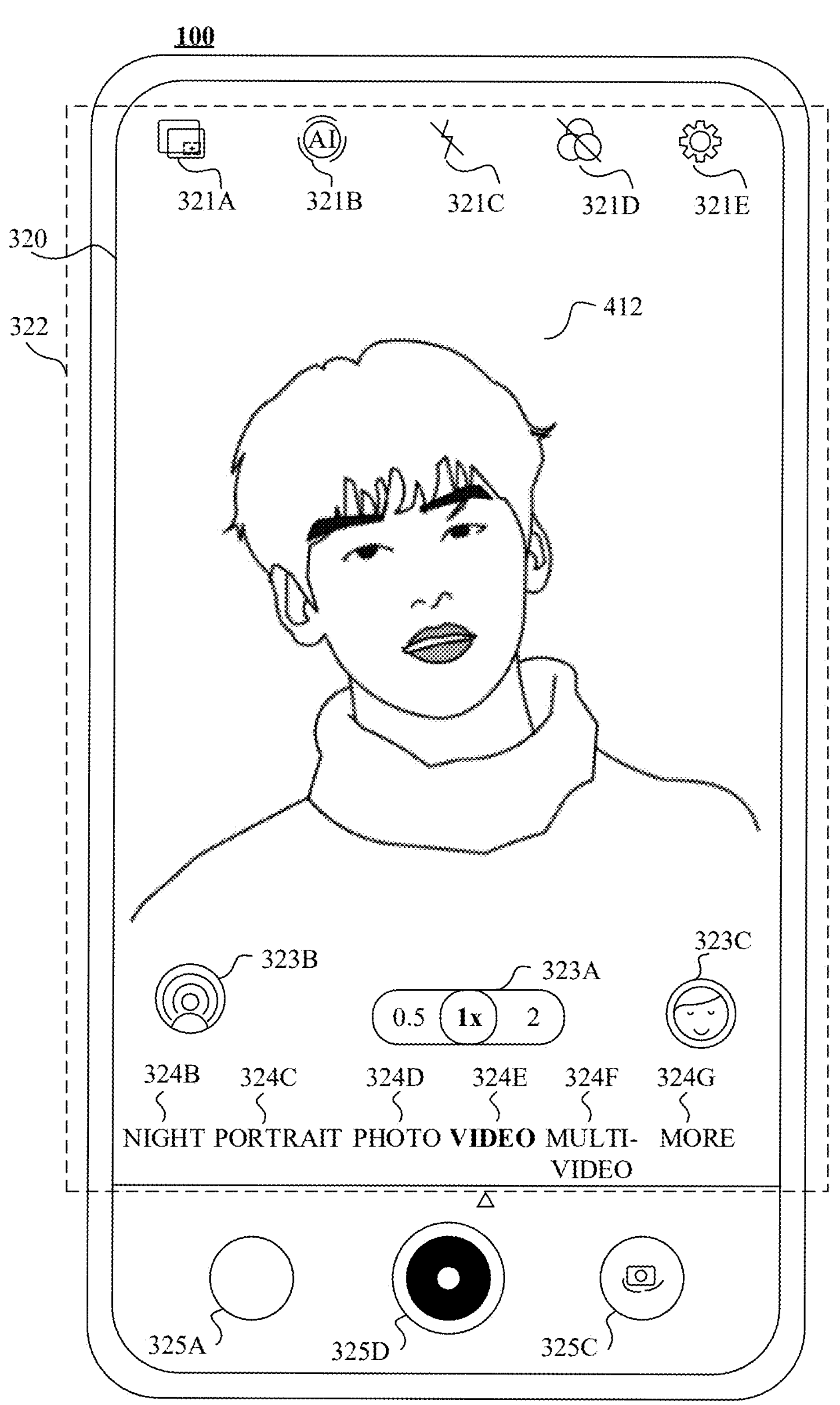

As shown in FIG. 4C, the electronic device 100 may process, by using an image processing procedure in the normal video recording mode, the image obtained in real time by the second camera, to obtain a real-time preview picture 412. After obtaining the real-time preview picture 412, the electronic device 100 may cancel display of the blurred image 411 in the preview box 322, and instead, display the real-time preview picture 412 in the preview box 322.

A photographing mode switching method provided in an embodiment of this application is described below with reference to software modules.

Figure 5A:
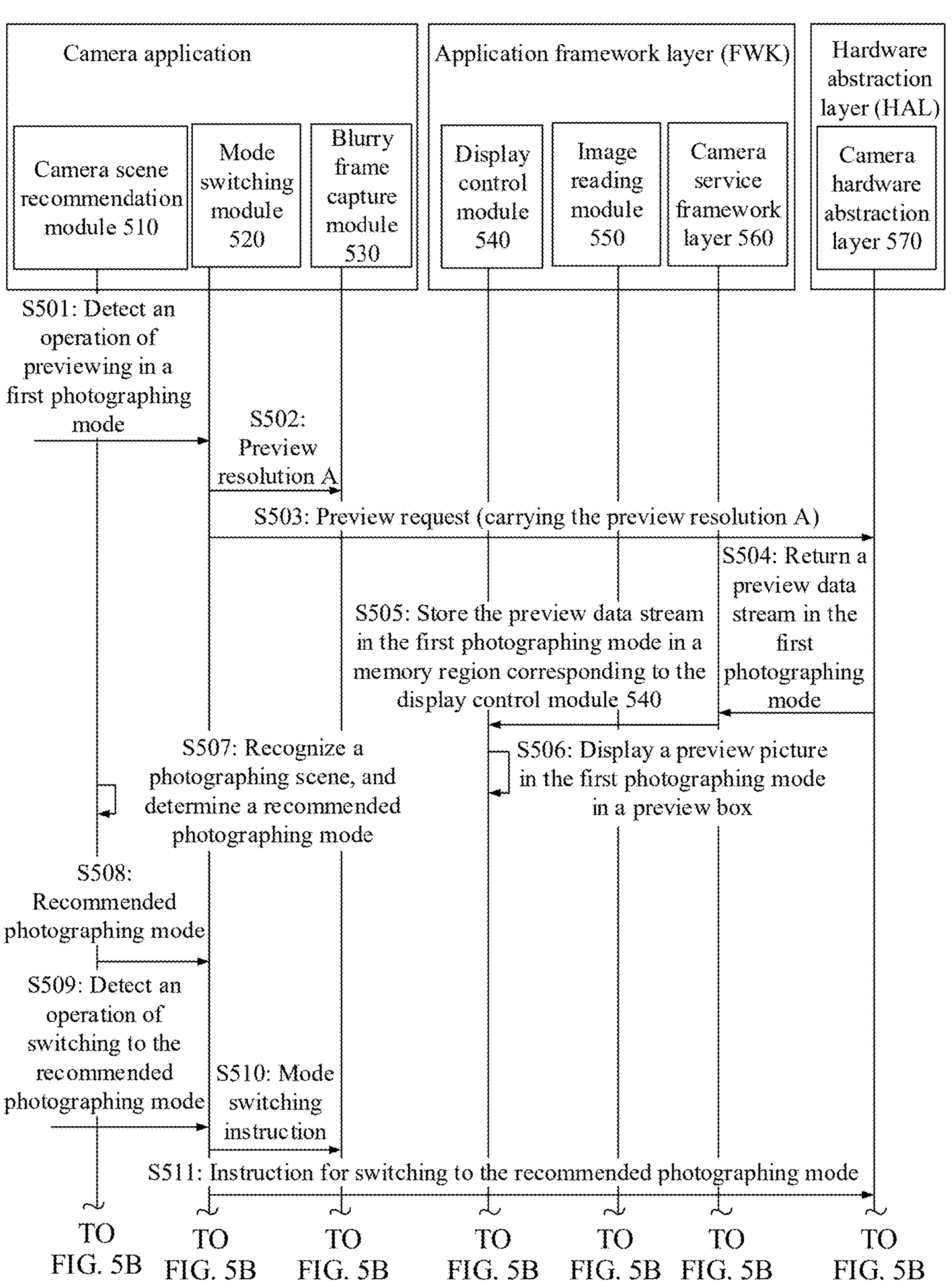
FIG. 5A and FIG. 5B are a schematic diagram of interaction between software modules in a photographing mode switching method according to an embodiment of this application.
Figure 5B:
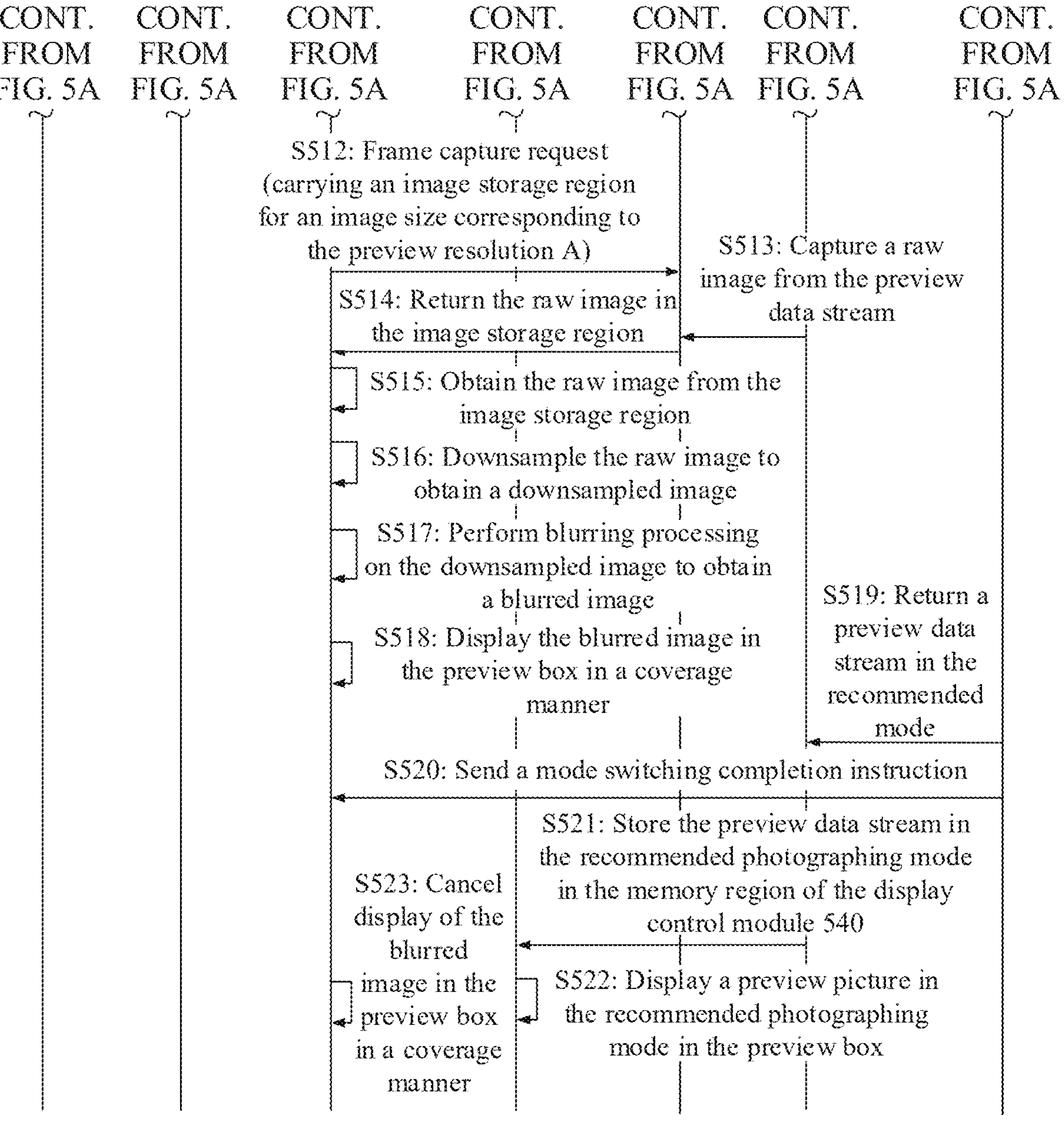

FIG. 5A and FIG. 5B are a schematic diagram of interaction between software modules in a photographing mode switching method according to an embodiment of this application.

As shown in FIG. SA, a software framework of an electronic device 100 may include a camera application, an application framework (framework, FWK) layer, and a hardware abstraction layer (hardware abstraction layer, HAL). The camera application may include a camera scene recommendation module 510, a mode switching module 520, and a blurry frame capture (capture blur) module 530. The application framework layer may include a display control module 540, an image reading (image reader) module 550, and a camera service framework layer 560. The hardware abstraction layer may include a camera hardware abstraction layer 570.

A process of interaction between the software modules of the electronic device 100 may include the following steps:

S501: The mode switching module 520 detects an operation of previewing in a first photographing mode.

The operation of previewing in the first photographing mode may be an operation of enabling the camera application by a user. Therefore, the first photographing mode may be a normal photographing mode. The operation of previewing in the first photographing mode may alternatively be an operation of selecting a normal video recording mode after the user enables the camera application to display a photographing interface. Therefore, the first photographing mode may be the normal video recording mode. In addition, the first photographing mode may alternatively be another photographing mode, for example, an APERTURE photographing mode, a NIGHT photographing mode, a NIGHT video recording mode, or the like. This is not limited herein.

S502: The mode switching module 520 sends preview resolution A to the blurry frame capture module 530.

The preview resolution A may be preset preview resolution in the camera application. For example, the preview resolution may be "1920*1080".

In a possible implementation, the preview resolution A may have a correspondence with a device type of the electronic device 100. For example, when the device type of the electronic device 100 is a mobile phone, the preview resolution A may be "1920*1080"; or when the device type of the electronic device 100 is a tablet computer, the preview resolution A may be "1280*720". The foregoing examples are merely used to explain this application, and shall not constitute any limitation.

In a possible implementation, the preview resolution A may have a correspondence with a photographing mode currently used by the electronic device 100. For example, when the electronic device 100 currently uses a photographing mode (the normal photographing mode, a PORTRAIT photographing mode, or the like), the preview resolution A may be "2560*1440"; or when the electronic device 100 currently uses a video recording mode (for example, the normal video recording mode, a PORTRAIT video recording mode, or the like), the preview resolution A may be "1920*1080", or the preview resolution A may be "1280*720". The foregoing examples are merely used to explain this application, and shall not constitute any limitation.

S503: The mode switching module 520 sends a preview request to the camera hardware abstraction layer 570 by using an inter-layer interface, where the preview request carries the preview resolution A. The preview request is used to request the camera hardware abstraction layer 570 to obtain a preview data stream in the first photographing mode.

After receiving the preview request, the camera hardware abstraction layer 570 may control, based on the preview resolution A carried in the preview request, a camera to capture an image stream in real time, to obtain the preview data stream with the preview resolution A from the image stream captured in real time.

S504: The camera hardware abstraction layer 570 transmits the preview data stream in the first photographing mode to the camera service framework layer 560.

S505: The camera service framework layer 560 stores the preview data stream in the first photographing mode in a memory region of the display control module 540.

S506: The display control module 540 may display a preview picture in the first photographing mode in a preview box based on the preview data stream in the first photographing mode.

After obtaining, from the memory region of the display control module 540, the preview data stream that has the preview resolution and that is transmitted by the camera service framework layer 560, the display control module 540 may continuously display, based on the preview data stream through drawing, the preview picture in the first photographing mode in the preview box by using a surface view (surface view). The surface view may define a size and a location of the preview box.

S507: The camera scene recommendation module 510 may recognize a photographing scene, and determine a recommended photographing mode.

The recommended photographing mode may include any one or a combination of a MACRO video recording mode, a NIGHT video recording mode, a PORTRAIT video recording mode, a high-dynamic video recording mode, a SOLO CUT video recording mode, a multi-lens video recording mode, and the like.

For example, a matching condition of the recommended photographing mode is shown in the following Table 1:

TABLE 1

| Recommended photographing mode | Matching condition | Applicable scene |
|---|---|---|
| MACRO video recording mode | Object distance < D1; illumination is less than L1; and zoom ratio = 1x | Close-range photographing |
| NIGHT video recording mode | Illumination > L2; and zoom ratio is within 1x~2x | Photograph a night scene |
| PORTRAIT video recording mode | Maximum face area ratio in a preview picture > P1; illumination < L3; and zoom ratio is within 1x~2x | Photograph a portrait |
| High-dynamic video recording mode | Exposure > M1; and zoom ratio is within 1x~6x | High-exposure photographing |
| SOLO CUT video recording mode | Quantity of faces in a preview picture ≥ 2; P2 < a maximum face area ratio in the preview picture < P1; illumination < L4; and zoom ratio is within 0.5x~2x | Photograph a plurality of people |
| Multi-lens video recording mode | It is recognized that a preview picture includes a preset object such as a cat or a dog; and zoom ratio is within 1x~6x | Photograph a specific object |

It may be learned from the foregoing Table 1 that, when the camera scene recommendation module 510 recognizes that a distance (an object distance) between a photographed object and the electronic device 100 is less than D1, illumination is less than L1, and a zoom ratio=1×, the camera scene recommendation module 510 may determine that the recommended photographing mode is the MACRO video recording mode. When the camera scene recommendation module 510 recognizes that illumination is greater than L2 and a zoom ratio is within 1×~2×, the camera scene recommendation module 510 may determine that the recommended photographing mode is the NIGHT video recording mode. When the camera scene recommendation module 510 recognizes that a maximum face area ratio in a preview picture>P1, illumination<L3, and a zoom ratio is within 1×~2×, the camera scene recommendation module 510 may determine that the recommended photographing mode is the PORTRAIT video recording mode. When the camera scene recommendation module 510 recognizes that a quantity of faces in a preview picture≥2, P2<a maximum face area ratio in the preview picture<P1, illumination<L4, and a zoom ratio is within 0.5×~2×, the camera scene recommendation module 510 may determine that the recommended photographing mode is the SOLO CUT video recording mode. When the camera scene recommendation module 501 recognizes that a preview picture includes a preset object such as a cat or a dog and a zoom ratio is within 1×~6×, the camera scene recommendation module 501 may determine that the recommended photographing mode is the multi-lens video recording mode.

The object distance threshold D1, the illumination thresholds L1, L2, L3, and L4, the proportion thresholds P1 and P2 are preset, and specific values thereof are not limited in this embodiment of this application. It may be understood that the specific values may be set by a developer based on experience. For example, D1=12 cm, L1=450 F, L2=440 F, L3=450 F, L4=350 F, P1=15%, and P2=7%. The foregoing examples are merely used to explain this application, and shall not constitute any limitation.

S508: The camera scene recommendation module 510 may send the recommended photographing mode to the mode switching module 520.

After receiving the recommended photographing mode, the mode switching module 520 may control to display a control of the recommended photographing mode.

S509: The mode switching module 520 may detect an operation of switching to the recommended photographing mode.

For example, after the electronic device 100 displays the control of the recommended photographing mode (for example, the PORTRAIT video recording mode), the mode switching module 520 may detect an operation performed by the user on the control of the recommended photographing mode. In response to the operation, the mode switching module 520 may determine that the recommended photographing mode needs to switch to.

S510: The mode switching module 520 may send a mode switching instruction to the blurry frame capture module 530 in response to the operation of switching to the recommended photographing mode.

S511: The mode switching module 520 may send, in response to the operation of switching to the recommended photographing mode, an instruction for switching to the recommended photographing mode to the camera hardware abstraction layer 570.

After obtaining the instruction for switching to the recommended photographing mode, the camera hardware abstraction layer 570 stops obtaining the preview data stream in the first photographing mode, and re-delivers a photographing parameter in the recommended photographing mode to the camera, to indicate the camera to capture an image stream in real time by using the photographing parameter in the recommended photographing mode. The camera hardware abstraction layer 570 may start an image processing module corresponding to the recommended photographing mode to process the image stream captured in real time by the camera, to obtain a preview data stream in the recommended photographing mode.

S512: After receiving the mode switching instruction, the blurry frame capture module 530 may send a frame capture request to the image reading module 550, where the frame capture request carries an image storage region for an image size corresponding to the preview resolution A.

For example, the preview resolution A is 1920*1080, and the image storage region for the image size corresponding to the preview resolution A may be used to store data whose image size is 1920*1080 pixels.

S513: After receiving the frame capture request, the image reading module 550 may capture a raw image from the preview data stream obtained by the camera service framework layer 560.

S514: The image reading module 550 may return the raw image to the blurry frame capture module 530 in the image storage region S515: The blurry frame capture module 530 obtains the raw image from the image storage region.

The image reading module 550 may capture the raw image based on the preview data stream obtained from the camera service framework layer 560, store data (for example, YUV data) of the raw image in the foregoing image storage region, and return an image type corresponding to the data of the raw image to the blurry frame capture module 530.

After obtaining the image type that is of the raw image and that is returned by the image reading module 550, the blurry frame capture module 530 may find the foregoing image storage region from a memory based on the image type of the raw image, and obtain the data of the raw image from the foregoing image storage region.

S516: The blurry frame capture module 530 downsamples the raw image to obtain a downsampled image.

The blurry frame capture module 530 downsamples the raw image based on the data of the raw image, that is, reduces resolution of the raw image. Resolution of the downsampled image is less than the resolution of the raw image. For example, the resolution of the raw image is "1920*1080", and after 100 times of downsampling, the resolution of the downsampled image is "192*108".

S517: The blurry frame capture module 530 performs blurring processing on the downsampled image to obtain a blurred image.

A blurring processing algorithm can only perform blurring processing on image data of a specified data type (for example, a bitmap (bitmap)). However, the data that is of the raw image and that is obtained by the blurry frame capture module 530 is data of a YUV type. Therefore, before performing blurring processing on the image, the blurry frame capture module 530 needs to convert the data of the image from the YUV type into the specified data type (for example, a bitmap type). After obtaining the downsampled image of the YUV type, the blurry frame capture module 530 may first convert data of the downsampled image from the YUV type into the bitmap type, and then perform blurring processing to obtain the blurred image of the bitmap type.

The blurry frame capture module 530 may perform blurring processing on the downsampled image by using a blurring processing algorithm, to obtain the blurred image. The blurring processing algorithm may include but is not limited to one or more of a Gaussian blur (gaussian blur) algorithm, a box blur (box blur) algorithm, a dual blur (dual blur) algorithm, a bokeh blur (bokeh blur) algorithm, a tilt shift blur (tilt shift blur) algorithm, an iris blur (iris blur) algorithm, a grainy blur (grainy blur) algorithm, a radial blur (radial blur) algorithm, a directional blur (directional blur) algorithm, and the like.

S518: After obtaining the blurred image, the blurry frame capture module 530 displays the blurred image in the preview box in a coverage manner.

After obtaining the blurred image, the blurry frame capture module 530 may display the blurred image in the preview box in a coverage manner, preventing a case that the photographing interface displays no picture during mode switching due to interruption of the preview data stream.

Specifically, the blurry frame capture module 530 may control to set, at an upper layer of the preview box, a blur control with a size the same as that of the preview box, and the blurry frame capture module 530 may display the blurred image in the blur control, so that the blurred image covers the preview box.

S519: After receiving the instruction for switching to the recommended photographing mode, the camera hardware abstraction layer 570 may obtain the preview data stream in the recommended photographing mode, and transmit the preview data stream in the recommended photographing mode to the camera service framework layer 560.

After receiving the instruction for switching to the recommended photographing mode, the camera hardware abstraction layer 570 may invoke the camera to capture an image in real time by using the photographing parameter in the recommended photographing mode, and process, by using an image processing procedure corresponding to the recommended photographing mode, the image captured in real time by the camera, to obtain the preview data stream in the recommended photographing mode.

S520: When obtaining the preview data stream in the recommended photographing mode, the camera hardware abstraction layer 570 sends a mode switching completion instruction to the blurry frame capture module 530.

When the camera hardware abstraction layer 570 obtains a first frame of image data in the preview data stream in the recommended photographing mode, the camera hardware abstraction layer 570 may send the mode switching completion instruction to the blurry frame capture module 530 by using an inter-layer interface.

S521: After obtaining the preview data stream in the recommended photographing mode, the camera service framework layer 560 stores the preview data stream in the recommended photographing mode in the memory region of the display control module 540.

S522: After obtaining the preview data stream in the recommended photographing mode from the memory region of the display control module 540, the display control module 540 displays a preview picture in the recommended photographing mode in the preview box.

S523: After receiving the mode switching completion instruction sent by the camera hardware abstraction layer 570, the blurry frame capture module 530 may cancel display of the blurred image in the preview box in a coverage manner.

According to the photographing mode switching method shown in FIG. 5A and FIG. 5B, when the electronic device 100 switches from the first photographing mode to a second photographing mode, the image reading module 550 captures the YUV data of the raw image from the camera service framework layer 560, and encapsulates and returns the image type to the blurry frame capture module 530. Further, the blurry frame capture module 530 obtains the raw image from the image storage region based on the image type, and performs downsampling and blurring processing to finally obtain the blurred image. The electronic device 100 then displays the blurred image in the preview box in a coverage manner until a preview image stream in the second photographing mode is obtained. This may prevent a case that the photographing interface displays no picture due to interruption of the preview data stream in the first photographing mode.

However, a data format of the preview data stream obtained by the image reading module 550 from the camera service framework layer 560 is a YUV type, the blurring processing algorithm can only process data of a specified data type (for example, a bitmap) different from the YUV type. Therefore, before performing blurring processing on the image, the blurry frame capture module 530 needs to convert image data of the YUV type into image data of the specified data type (for example, the bitmap). In addition, before performing blurring processing on the raw image, the blurry frame capture module 530 needs to downsample the raw image to reduce subsequent blurring processing time. However, the blurry frame capture module 530 runs on a central processing unit (central processor unit, CPU) (or an application processor (application processor, AP)), and there are many processing tasks on the central processing unit (or the application processor) As a result, it takes a long time for the blurry frame capture module 530 to downsample the raw image and covert a format of the raw image. For example, it is learned through experimental data that, according to the foregoing method in the embodiment shown in FIG. 5A and FIG. 5B, it needs to take 100 ms~150 ms from detecting, by the electronic device 100, an operation of switching a photographing mode to displaying a blurred image in a preview box.

Therefore, an embodiment of this application provides another photographing mode switching method. When detecting an operation of switching from a first photographing mode to a second photographing mode, an electronic device 100 may invoke, by using a pixel copy (pixel copy) interface, a GPU to obtain a frame of preview data in the first photographing mode from a memory region of a display control module, and downsample the frame of the preview data to a specified image size to obtain a downsampled image of a specified data type; and perform blurring processing on the downsampled image of the specified data type returned by the GPU, to obtain a blurred image, and display the blurred image in a preview box in a coverage manner. In this way, the preview data is downsampled while being obtained by using the GPU from a memory, so that a process of obtaining the downsampled image can be accelerated. In addition, after directly obtaining a frame of preview data of a YUV type from the memory, the GPU may quickly convert the frame of preview data into preview data of a bitmap type. The GPU may directly return a downsampled image of the bitmap type to a blurry frame capture module in the CPU for blurring processing. In this way, no format conversion needs to be performed on an image, and time for obtaining the blurred image is reduced. For example, it is learned through experimental data that, it only needs to take 5 ms~20 ms from detecting, by the electronic device 100, an operation of switching a photographing mode to displaying a blurred image in a preview box.

Another photographing mode switching method provided in this embodiment of this application is specifically described below.

Figure 6A:
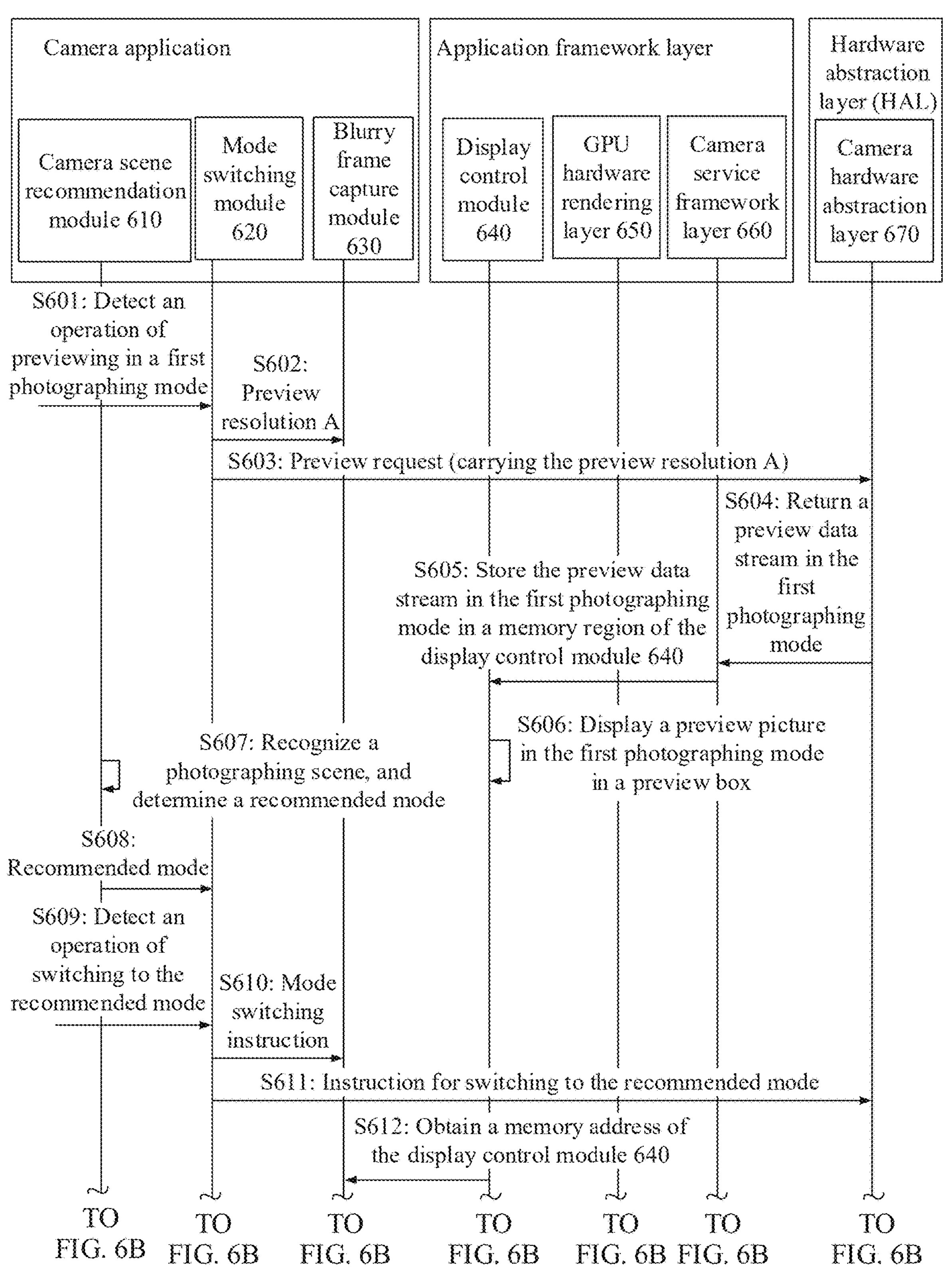
FIG. 6A and FIG. 6B are a schematic diagram of interaction between software modules in another photographing mode switching method according to an embodiment of this application.
Figure 6B:
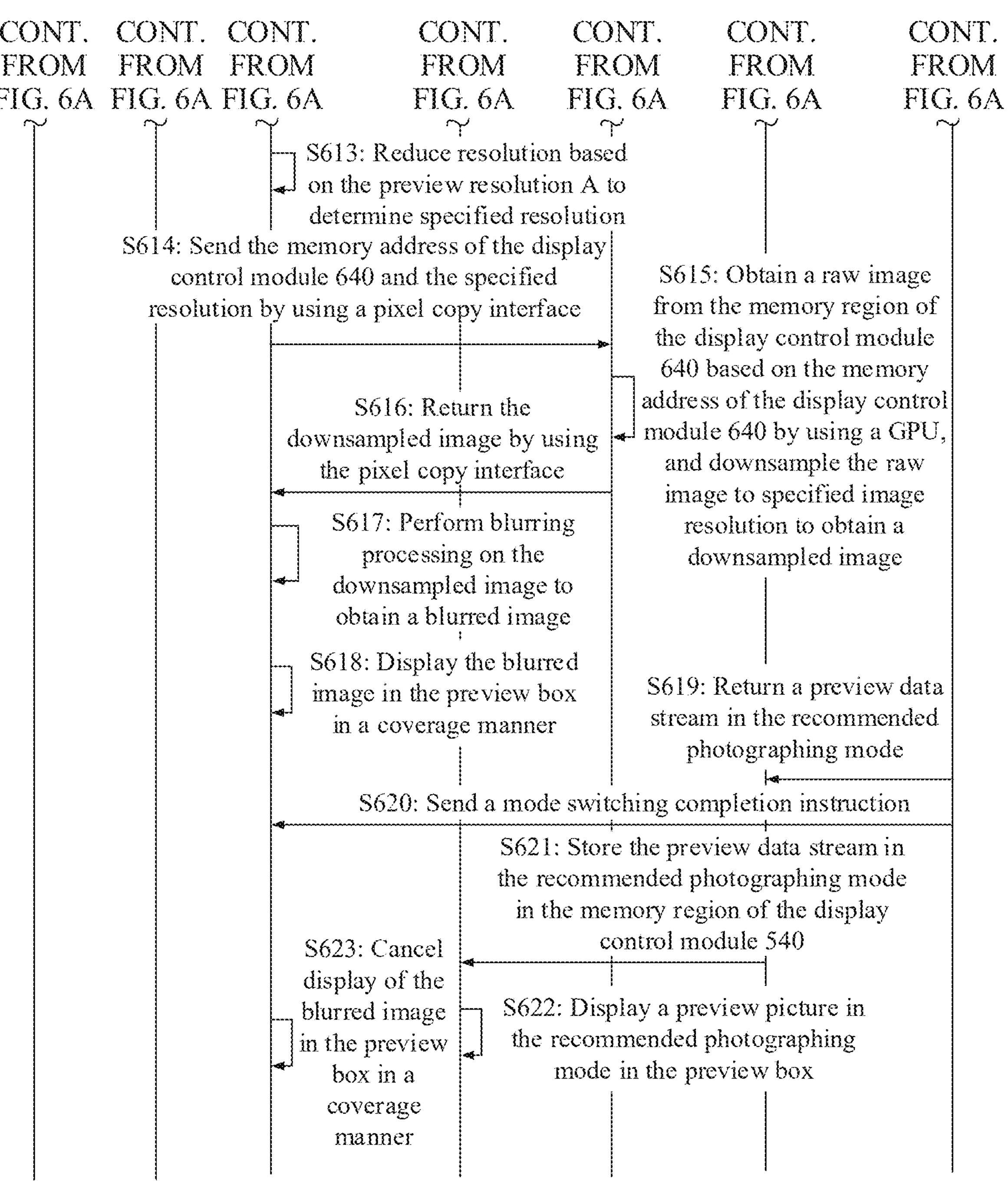

FIG. 6A and FIG. 6B are a schematic diagram of interaction between software modules in another photographing mode switching method according to an embodiment of this application.

As shown in FIG. 6A, a software framework of an electronic device 100 may include a camera application, an application framework (FWK) layer, and a hardware abstraction layer (HAL). The camera application may include a camera scene recommendation module 610, a mode switching module 620, and a blurry frame capture module 630. The application framework layer may include a display control module 640, a GPU hardware rendering layer 650, and a camera service framework layer 660. The hardware abstraction layer may include a camera hardware abstraction layer 670.

A process of interaction between the software modules of the electronic device 100 may include the following steps:

S601: The mode switching module 620 detects an operation of starting camera preview.

An operation of previewing in the first photographing mode may be an operation of enabling the camera application by a user. Therefore, the first photographing mode may be a normal photographing mode. The operation of previewing in the first photographing mode may alternatively be an operation of selecting a normal video recording mode after the user enables the camera application to display a photographing interface. Therefore, the first photographing mode may be the normal video recording mode. In addition, the first photographing mode may alternatively be another photographing mode, for example, an APERTURE photographing mode, a NIGHT photographing mode, a NIGHT video recording mode, or the like. This is not limited herein.

S602: The mode switching module 620 sends preview resolution A to the blurry frame capture module 630.

The preview resolution A may be preset preview resolution in the camera application. For example, the preview resolution may be "1920*1080".

In a possible implementation, the preview resolution A may have a correspondence with a device type of the electronic device 100. For example, when the device type of the electronic device 100 is a mobile phone, the preview resolution A may be "1920*1080"; or when the device type of the electronic device 100 is a tablet computer, the preview resolution A may be "1280*720". The foregoing examples are merely used to explain this application, and shall not constitute any limitation.

In a possible implementation, the preview resolution A may have a correspondence with a photographing mode currently used by the electronic device 100. For example, when the electronic device 100 currently uses a photographing mode (the normal photographing mode, a PORTRAIT photographing mode, or the like), the preview resolution A may be "2560*1440"; or when the electronic device 100 currently uses a video recording mode (for example, the normal video recording mode, a PORTRAIT video recording mode, or the like), the preview resolution A may be "1920*1080", or the preview resolution A may be "1280*720". The foregoing examples are merely used to explain this application, and shall not constitute any limitation.

S603: The mode switching module 620 sends a preview request to the camera hardware abstraction layer 670 by using an inter-layer interface, where the preview request carries the preview resolution A. The preview request is used to request the camera hardware abstraction layer 670 to obtain a preview data stream in the first photographing mode.

After receiving the preview request, the camera hardware abstraction layer 670 may control, based on the preview resolution A carried in the preview request, a camera to capture an image stream in real time, to obtain the preview data stream with the preview resolution A from the image stream captured in real time.

S604: The camera hardware abstraction layer 670 transmits the preview data stream in the first photographing mode to the camera service framework layer 660.

S605: The camera service framework layer 660 stores the preview data stream in the first photographing mode in a memory region of the display control module 640.

S606: The display control module 640 may display a preview picture in the first photographing mode in a preview box based on the preview data stream in the first photographing mode.

After obtaining, from a memory address of the display control module 640, the preview data stream that has the preview resolution and that is transmitted by the camera service framework layer 660, the display control module 640 may continuously display, based on the preview data stream through drawing, the preview picture in the first photographing mode in the preview box by using a surface view (surface view). The surface view may define a size and a location of the preview box.

S607: The camera scene recommendation module 610 may recognize a photographing scene, and determine a recommended photographing mode.

The recommended photographing mode may include any one or a combination of a MACRO video recording mode, a NIGHT video recording mode, a PORTRAIT video recording mode, a high-dynamic video recording mode, a SOLO CUT video recording mode, a multi-lens video recording mode, and the like. For a matching condition of the recommended photographing mode, refer to step S507 in the embodiment shown in FIG. 5A. Details are not described herein again.

S608: The camera scene recommendation module 610 may send the recommended photographing mode to the mode switching module 620.

S609: The mode switching module 620 may detect an operation of switching to the recommended photographing mode.

S610: The mode switching module 620 may send a mode switching instruction to the blurry frame capture module 630 in response to the operation of switching to the recommended photographing mode.

S611: The mode switching module 620 may send, in response to the operation of switching to the recommended photographing mode, an instruction for switching to the recommended photographing mode to the camera hardware abstraction layer 670.

After obtaining the instruction for switching to the recommended photographing mode, the camera hardware abstraction layer 670 stops obtaining the preview data stream in the first photographing mode, and re-delivers a photographing parameter in the recommended photographing mode to the camera, to indicate the camera to capture an image stream in real time by using the photographing parameter in the recommended photographing mode. The camera hardware abstraction layer 670 may start an image processing module corresponding to the recommended photographing mode to process the image stream captured in real time by the camera, to obtain a preview data stream in the recommended photographing mode.

S612: The blurry frame capture module 630 may obtain the memory address of the display control module 640 in response to the mode switching instruction.

The memory address of the display control module 640 stores the preview data stream in the first photographing mode.

S613: The blurry frame capture module 630 reduces resolution based on the preview resolution A to determine specified resolution.

The specified resolution is less than the preview resolution A. For example, the preview resolution A may be 1920*1080, and the specified resolution may be 192*108.

S614: The blurry frame capture module 630 sends the memory address of the display control module 640 and the specified resolution to the GPU hardware rendering layer 650 by using a pixel copy (pixel copy) interface.

S615: The GPU hardware rendering layer 650 obtains a raw image from the memory region of the display control module 640 based on the memory address of the display control module 640 by using a GPU, and downsamples the raw image to the specified resolution to obtain a downsampled image.

The resolution of the downsampled image is less than resolution of the raw image. For example, the resolution of the raw image is "1920*1080", and after 100 times of downsampling, the resolution of the downsampled image is "192*108".

S616: The GPU hardware rendering layer 650 returns the downsampled image to the blurry frame capture module 630 by using the pixel copy interface.

Because data of the raw image obtained by the GPU is of a YUV type, after downsampling the YUV data of the raw image to obtain YUV data of the downsampled image, the GPU may convert the YUV data of the downsampled image into bitmap data of the downsampled image.

After converting the YUV data of the downsampled image into the bitmap data of the downsampled image, the GPU may store the bitmap data of the downsampled image in a specified region in a memory, and return an address of the specified region in the memory to the blurry frame capture module 630 by using the pixel copy interface through the GPU hardware rendering layer 650. The blurry frame capture module 630 may obtain the bitmap data of the downsampled image from the specified region in the memory based on the address of the specified region.

S617: The blurry frame capture module 630 performs blurring processing on the downsampled image to obtain a blurred image.

The blurry frame capture module 630 may perform blurring processing on the downsampled image based on the bitmap data of the downsampled image by using a blurring processing algorithm, to obtain the blurred image. The blurring processing algorithm may include but is not limited to one or more of a Gaussian blur (gaussian blur) algorithm, a box blur (box blur) algorithm, a dual blur (dual blur) algorithm, a bokeh blur (bokeh blur) algorithm, a tilt shift blur (tilt shift blur) algorithm, an iris blur (iris blur) algorithm, a grainy blur (grainy blur) algorithm, a radial blur (radial blur) algorithm, a directional blur (directional blur) algorithm, and the like.

S618: After obtaining the blurred image, the blurry frame capture module 630 displays the blurred image in the preview box in a coverage manner.

After obtaining the blurred image, the blurry frame capture module 630 may display the blurred image in the preview box in a coverage manner, preventing a case that the photographing interface displays no picture during mode switching due to interruption of the preview data stream.

Specifically, the blurry frame capture module 630 may control to set, at an upper layer of the preview box, a blur control with a size the same as that of the preview box, and the blurry frame capture module 630 may display the blurred image in the blur control, so that the blurred image covers the preview box.

S619. After receiving the instruction for switching to the recommended photographing mode, the camera hardware abstraction layer 670 may obtain the preview data stream in the recommended photographing mode, and transmit the preview data stream in the recommended photographing mode to the camera service framework layer 660.

After receiving the instruction for switching to the recommended photographing mode, the camera hardware abstraction layer 670 may invoke the camera to capture an image in real time by using the photographing parameter in the recommended photographing mode, and process, by using an image processing procedure corresponding to the recommended photographing mode, the image captured in real time by the camera, to obtain the preview data stream in the recommended photographing mode.

S620: When obtaining the preview data stream in the recommended photographing mode, the camera hardware abstraction layer 670 sends a mode switching completion instruction to the blurry frame capture module 630.

When the camera hardware abstraction layer 670 obtains a first frame of image data in the preview data stream in the recommended photographing mode, the camera hardware abstraction layer 670 may send the mode switching completion instruction to the blurry frame capture module 530 by using an inter-layer interface.

S621: After obtaining the preview data stream in the recommended photographing mode, the camera service framework layer 660 stores the preview data stream in the recommended photographing mode in the memory region of the display control module 540.

S622: After obtaining the preview data stream in the recommended photographing mode from the memory region of the display control module 640, the display control module 640 displays a preview picture in the recommended photographing mode in the preview box.

S623: After receiving the mode switching completion instruction sent by the camera hardware abstraction layer 670, the blurry frame capture module 630 may cancel display of the blurred image in the preview box in a coverage manner.

This embodiment of this application provides a photographing mode switching method. When detecting an operation of switching from a first photographing mode to a second photographing mode, an electronic device 100 may invoke, by using a pixel copy (pixel copy) interface, a GPU to obtain a frame of preview data in the first photographing mode from the memory region of the display control module, and downsample the frame of the preview data to a specified image size to obtain a downsampled image of a specified data type; and perform blurring processing on the downsampled image of the specified data type returned by the GPU, to obtain a blurred image, and displays the blurred image in a preview box in a coverage manner. In this way, the preview data is downsampled while being obtained by using the GPU, so that a process of obtaining the downsampled image can be accelerated, and the blurred image can be quickly obtained and displayed in the preview box, preventing a case that a photographing interface displays no picture due to interruption of a preview data stream in the first photographing mode.

FIG. 7 is a schematic flowchart of a photographing mode switching method according to an embodiment of this application.

As shown in FIG. 7, the method includes the following steps:

S701: An electronic device 100 displays a first preview interface, where the first preview interface includes a first preview box, and the first preview box displays a preview picture captured by a camera of the electronic device in a first photographing mode.

For example, the first photographing mode may be a normal photographing mode. An operation of previewing in the first photographing mode may alternatively be an operation of selecting a normal video recording mode after a user enables a camera application to display a photographing interface. Therefore, the first photographing mode may be the normal video recording mode. In addition, the first photographing mode may alternatively be another photographing mode, for example, an APERTURE photographing mode, a NIGHT photographing mode, a NIGHT video recording mode, or the like. This is not limited herein.

For example, the first photographing mode may be the normal photographing mode, the first preview interface may be the photographing interface 320 shown in the embodiment shown in FIG. 3B, and the preview box may be the preview box 322 shown in the embodiment shown in FIG. 3B. For specific content, refer to the embodiment shown in FIG. 3B. Details are not described herein again.

For another example, the first photographing mode may be the normal video recording mode, the first preview interface may be the photographing interface 320 shown in the embodiment shown in FIG. 3E, and the preview box may be the preview box 341 shown in the embodiment shown in FIG. 3E. For specific content, refer to the embodiment shown in FIG. 3E. Details are not described herein again.

Resolution of the preview picture captured by the camera of the electronic device 100 in the first photographing mode is first resolution.

For example, the first resolution may be 1920*1080 pixels.

S702: Receive a first operation of switching from the first photographing mode to a second photographing mode, where the first photographing mode is different from the second photographing mode.

The second photographing mode may be any one of the following: a normal video recording mode, a MACRO video recording mode, a NIGHT video recording mode, a PORTRAIT video recording mode, a high-dynamic video recording mode, a SOLO CUT video recording mode, and a multi-lens video recording mode.

In a possible implementation, the electronic device 100 may recognize a photographing scene, and determine the second photographing mode. The electronic device 100 displays, in the first preview interface, a first control corresponding to the second photographing mode. The first operation may be an operation performed on the first control.

For example, the first photographing mode may be the normal video recording mode, the second photographing mode may be the PORTRAIT video recording mode, the first control may be the control 329 of the PORTRAIT video recording mode in the embodiment shown in FIG. 3E, and the first operation may be an operation performed on the control 329 of the PORTRAIT video recording mode. For specific content, refer to the embodiment shown in FIG. 3E. Details are not described herein again.

For another example, the first photographing mode may be the PORTRAIT video recording mode, and the second photographing mode may be the high-dynamic video recording mode. The first control may be the control 329 of the PORTRAIT video recording mode in the embodiment shown in FIG. 3E. The first operation may be an operation performed on the control 329 of the PORTRAIT video recording mode. For specific content, refer to the embodiment shown in FIG. 3E. Details are not described herein again.

In an example, the first photographing mode may be the PORTRAIT video recording mode, and the second photographing mode may be the normal video recording mode. The first operation may be an operation performed on the disable control 333 in the portrait video recording interface 330 shown in FIG. 3G. For specific content, refer to the embodiment shown in FIG. 3G. Details are not described herein again.

S703: In response to the first operation, invoke a graphics processing unit GPU to obtain a raw image from preview data that is in the first photographing mode and that is stored in a memory, where the preview data in the first photographing mode is used to display, in the first preview box, the preview picture captured in the first photographing mode.

For specific content, refer to the embodiment shown in FIG. 6A and FIG. 6B. Details are not described herein again.

S704. Downsample the raw image to specified resolution by using the GPU to obtain a downsampled image of a specified type, where the specified resolution is less than the first resolution.

For specific content, refer to the embodiment shown in FIG. 6A and FIG. 6B. Details are not described herein again.

S705: Perform blurring processing on the downsampled image of the specified type to obtain a blurred image.

For a blurring processing process, refer to the embodiment shown in FIG. 6A and FIG. 6B. Details are not described herein again.

S706: The electronic device 100 displays the blurred image in the preview box in a coverage manner.

S707: The electronic device 100 cancels display of the blurred image in the preview box when obtaining a preview picture captured by the camera of the electronic device in the second photographing mode, and displays, in the preview box, the preview picture captured by the camera of the electronic device 100 in the second photographing mode.

For a part that is not described in detail in this embodiment of this application, refer to the foregoing embodiment. Details are not described herein again.

This embodiment of this application provides a photographing mode switching method. When detecting an operation of switching from a first photographing mode to a second photographing mode, an electronic device 100 may invoke, by using a pixel copy (pixel copy) interface, a GPU to obtain a frame of preview data in the first photographing mode from the memory region of the display control module, and downsample the frame of the preview data to a specified image size to obtain a downsampled image of a specified data type: and perform blurring processing on the downsampled image of the specified data type returned by the GPU, to obtain a blurred image, and displays the blurred image in a preview box in a coverage manner. In this way, the preview data is downsampled while being obtained by using the GPU, so that a process of obtaining the downsampled image can be accelerated, and the blurred image can be quickly obtained and displayed in the preview box, preventing a case that a photographing interface displays no picture due to interruption of a preview data stream in the first photographing mode.

An embodiment of this application further provides a computer-readable storage medium. The computer-readable storage medium stores a computer program, and when the computer program is executed by a processor, the steps in the foregoing method embodiments may be implemented.

An embodiment of this application further provides a computer program product. When the computer program product runs on an electronic device, the electronic device is enabled to implement the steps in the foregoing method embodiments.

An embodiment of this application further provides a chip system. The chip system includes a processor. The processor is coupled to a storage, and the processor executes a computer program stored in the storage, to implement the steps in any method embodiment of this application. The chip system may be a single chip or a chip module including a plurality of chips.

A term "user interface (user interface. UI)" in the specification, claims, and accompanying drawings of this application is a medium interface for interaction and information exchange between an application or an operating system and a user, and the medium interface implements conversion between an internal form of information and a form acceptable to the user. A user interface of an application is source code written in a specific computer language such as java or an extensible markup language (extensible markup language, XML). The source code of the interface is parsed and rendered on a terminal device, and is finally presented as user-recognizable content, for example, a control such as a picture, a text, or a button. The control (control) is also referred to as a widget (widget), and is a basic element of the user interface. Typical controls include a toolbar (toolbar), a menu bar (menu bar), a text box (text box), a button (button), a scrollbar (scrollbar), a picture, and a text. An attribute and content of the control in the interface are defined by using a label or a node. For example, the control included in the interface is defined in the XML by using a node such as <Textview>, <ImgView>, or <VideoView>. One node corresponds to one control or attribute in the interface. After being parsed and rendered, the node is presented as user-visible content. In addition, interfaces of many applications, such as a hybrid application (hybrid application), usually further include a web page. The web page, also referred to as a page, may be understood as a special control embedded in an interface of an application. The web page is source code written in a specific computer language, for example, a hyper text markup language (hyper text markup language, HTML), a cascading style sheet (cascading style sheets, CSS), or a javascript (JavaScript, JS). The source code of the web page may be loaded and displayed as user-recognizable content by a browser or a web page display component with a function similar to that of the browser. Specific content included in the web page is also defined by using a label or a node in the source code of the web page. For example, an element and an attribute of the web page are defined in the HTML by using <p>, <img>, <video>, and <canvas>.

The user interface is usually in a representation form of a graphical user interface (graphic user interface, GUI), and the graphical user interface is a user interface that is related to a computer operation and that is displayed in a graphical manner. The graphical user interface may be an interface element such as an icon, a window, or a control that is displayed on a display screen of an electronic device. The control may include visible interface elements such as an icon, a button. a menu, a tab, a text box, a dialog box, a status bar, a navigation bar, and a Widget.

The singular expression forms "one", "a", "the", "the foregoing", and "this" used in the specification and the appended claims of this application are also intended to include plural expression forms, unless otherwise specified in the context clearly. It should be further understood that the term "and/or" used in this application indicates and includes any or all possible combinations of one or more listed items. As used in the foregoing embodiments, based on the context, the term "when . . . " may be interpreted as a meaning of "if . . . ", "after . . . ", "in response to determining . . . ", or "in response to detecting . . . ". Similarly, based on the context, the phrase "when determining . . . " or "if detecting (a stated condition or event)" may be interpreted as a meaning of "if determining . . . ", "in response to determining . . . ", "when detecting (a stated condition or event)". or "in response to detecting . . . (a stated condition or event)".

All or some of the foregoing embodiments may be implemented by using software, hardware, firmware, or any combination thereof. When the software is used for implementation, some or all of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line) or a wireless manner (for example, infrared, wireless, or microwave) The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the foregoing embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, for example, a ROM, a random access memory RAM, a magnetic disk, or an optical disc.

The foregoing embodiments are merely intended to describe the technical solutions in this application, but not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof. However, these modifications or replacements do not make the essence of the corresponding technical solutions depart from the scope of the technical solutions in the embodiments of this application.

The invention claimed is:

1. A photographing mode switching method, applied to an electronic device having a camera, wherein the method comprises:

- displaying a first preview interface, wherein the first preview interface comprises a preview box, the preview box displays a preview picture captured by the camera of the electronic device in a first photographing mode, and resolution of the preview picture captured by the camera of the electronic device in the first photographing mode is first resolution;
- receiving a first operation of switching from the first photographing mode to a second photographing mode, wherein the first photographing mode is different from the second photographing mode;

in response to the first operation, obtaining a memory address of a display control module at an application framework layer on the electronic device, wherein a memory region corresponding to the memory address of the display control module stores preview data in the first photographing mode, and the preview data in the first photographing mode is used to display, in the preview box, the preview picture captured in the first photographing mode;

invoking a graphics processing unit GPU to obtain a raw image that is stored in the memory region corresponding to the memory address of the display control module;

downsampling the raw image to specified resolution by using the GPU to obtain a downsampled image of a specified type, wherein the specified resolution is less than the first resolution;

performing blurring processing on the downsampled image of the specified type to obtain a blurred image;

displaying the blurred image in the preview box in a coverage manner; and cancelling display of the blurred image in the preview box when a preview picture captured by the camera of the electronic device in the second photographing mode is obtained, and displaying, in the preview box, the preview picture captured by the camera of the electronic device in the second photographing mode.

2. The method according to claim 1, wherein before the receiving a first operation of switching from the first photographing mode to a second photographing mode, the method further comprises:

recognizing a photographing scene and determining the second photographing mode based on the photographing scene; and displaying, in the preview interface, a first control corresponding to the second photographing mode, wherein the first operation is an operation performed on the first control.

3. The method according to claim 2, wherein the first preview interface further comprises an AI scene recognition control; and before the recognizing a photographing scene and determining the second photographing mode based on the photographing scene, the method further comprises:

receiving a second operation performed on the AI scene recognition control; and the recognizing a photographing scene and determining the second photographing mode specifically comprises:

recognizing the photographing scene in response to the second operation, and determining the second photographing mode based on the photographing scene.

4. The method according to claim 1, wherein that the preview box displays a preview picture captured by the camera of the electronic device in a first photographing mode specifically comprises:

after obtaining the preview data in the first photographing mode by using the camera, sending, by a camera hardware abstraction layer of the electronic device, the preview data in the first photographing mode to a camera service framework layer of the electronic device;

storing, by the camera service framework layer, the preview data in the first photographing mode in a memory region of a display control module at an application framework layer on the electronic device; and displaying, by the display control module in the preview box based on the preview data in the first photographing mode in the memory region of the display control module, the preview picture captured by the camera of the electronic device in the first photographing mode.

5. The method according to claim 4, wherein the receiving a first operation of switching from the first photographing mode to a second photographing mode specifically comprises:

detecting, by using a mode switching module in a camera application on the electronic device, the first operation of switching from the first photographing mode to the second photographing mode;

the method further comprises:

sending, by the mode switching module, a mode switching instruction to a blurry frame capture module in the camera application, and sending an instruction for switching to the second photographing mode to the camera hardware abstraction layer on the electronic device;

the obtaining a memory address of the display control module at the application framework layer on the electronic device specifically comprises:

obtaining, by the blurry frame capture module, a memory address of the display control module at the application framework layer on the electronic device; and the method further comprises:

sending, by the blurry frame capture module, the memory address of the display control module to a GPU hardware rendering layer at the application framework layer; and the invoking a graphics processing unit GPU to obtain a raw image that is stored in the memory region corresponding to the memory address of the display control module specifically comprises:

after obtaining the memory address of the display control module, controlling, by the GPU hardware rendering layer, the GPU to obtain the raw image from the memory region corresponding to the memory address of the display control module.

6. The method according to claim 5, wherein the sending, by the blurry frame capture module, the memory address of the display control module to a GPU hardware rendering layer at the application framework layer specifically comprises:

sending, by the blurry frame capture module, the memory address of the display control module to the GPU hardware rendering layer at the application framework layer by using a pixel copy interface.

7. The method according to claim 6, wherein the downsampling the raw image to specified resolution by using the GPU to obtain a downsampled image of a specified type specifically comprises:

after obtaining the raw image of a first data type from the memory region corresponding to the memory address of the display control module, downsampling, by the GPU, the raw image of the first data type to the specified resolution, and converting the raw image of the first data type into the raw image of a specified data type to obtain the downsampled image, wherein a data type of the downsampled image is the specified type, and the specified type is different from the first data type; and returning, by the GPU, the downsampled image to the blurry frame capture module by using the GPU hardware rendering layer.

8. The method according to claim 7, wherein the performing blurring processing on the downsampled image of the specified type to obtain a blurred image specifically comprises:

after obtaining the downsampled image, performing, by the blurry frame capture module, blurring processing on the downsampled image to obtain the blurred image; and the displaying the blurred image in the preview box in a coverage manner specifically comprises:

controlling, by the blurry frame capture module, display of the blurred image in the first preview box in a coverage manner.

9. The method according to claim 8, wherein the cancelling display of the blurred image in the preview box when a preview picture captured by the camera of the electronic device in the second photographing mode is obtained specifically comprises:

when obtaining preview data in the second photographing mode, sending, by the camera hardware abstraction layer, a mode switching completion instruction to the blurry frame capture module, wherein the preview data in the second photographing mode is used by the display control module to display, in the preview box, the preview picture captured in the second photographing mode; and cancelling, by the blurry frame capture module in response to the mode switching completion instruction, display of the blurred image in the preview box in a coverage manner.

10. The method according to claim 1, wherein the data type of the raw image is a YUV type, and the data type of the downsampled image is a bitmap type.

11. The method according to claim 1, wherein the first photographing mode is any one of the following: a normal video recording mode, a MACRO video recording mode, a NIGHT video recording mode, a PORTRAIT video recording mode, a high-dynamic video recording mode, a SOLO CUT video recording mode, and a multi-lens video recording mode; and the second photographing mode is any one of the following: a normal video recording mode, a MACRO video recording mode, a NIGHT video recording mode, a PORTRAIT video recording mode, a high-dynamic video recording mode, a SOLO CUT video recording mode, and a multi-lens video recording mode.

12. An electronic device, comprising a camera, one or more processors, and one or more storages, wherein the camera and the one or more storages are coupled to the one or more processors, the one or more storages are configured to store computer program code, the computer program code comprises computer instructions, and when the electronic device executes the computer instructions, the electronic device performs the following operations:

displaying a first preview interface, wherein the first preview interface comprises a preview box, the preview box displays a preview picture captured by the camera of the electronic device in a first photographing mode, and resolution of the preview picture captured by the camera of the electronic device in the first photographing mode is first resolution;

receiving a first operation of switching from the first photographing mode to a second photographing mode, wherein the first photographing mode is different from the second photographing mode;

in response to the first operation, obtaining a memory address of a display control module at an application framework layer on the electronic device, wherein a memory region corresponding to the memory address of the display control module stores preview data in the first photographing mode, and the preview data in the first photographing mode is used to display, in the preview box, the preview picture captured in the first photographing mode;

invoking a graphics processing unit GPU to obtain a raw image that is stored in the memory region corresponding to the memory address of the display control module;

downsampling the raw image to specified resolution by using the GPU to obtain a downsampled image of a specified type, wherein the specified resolution is less than the first resolution;

performing blurring processing on the downsampled image of the specified type to obtain a blurred image;

displaying the blurred image in the preview box in a coverage manner; and cancelling display of the blurred image in the preview box when a preview picture captured by the camera of the electronic device in the second photographing mode is obtained, and displaying, in the preview box, the preview picture captured by the camera of the electronic device in the second photographing mode.

13. A non-transitory computer-readable storage medium, comprising instructions, wherein when the instructions are run on an electronic device, the electronic device performs the following operations:

displaying a first preview interface, wherein the first preview interface comprises a preview box, the preview box displays a preview picture captured by a camera of the electronic device in a first photographing mode, and resolution of the preview picture captured by the camera of the electronic device in the first photographing mode is first resolution;

receiving a first operation of switching from the first photographing mode to a second photographing mode, wherein the first photographing mode is different from the second photographing mode;

in response to the first operation, obtaining a memory address of a display control module at an application framework layer on the electronic device, wherein a memory region corresponding to the memory address of the display control module stores preview data in the first photographing mode, and the preview data in the first photographing mode is used to display, in the preview box, the preview picture captured in the first photographing mode;

invoking a graphics processing unit GPU to obtain a raw image that is stored in the memory region corresponding to the memory address of the display control module;

downsampling the raw image to specified resolution by using the GPU to obtain a downsampled image of a specified type, wherein the specified resolution is less than the first resolution;

performing blurring processing on the downsampled image of the specified type to obtain a blurred image;

displaying the blurred image in the preview box in a coverage manner;

and cancelling display of the blurred image in the preview box when a preview picture captured by the camera of the electronic device in the second photographing mode is obtained, and displaying, in the preview box, the preview picture captured by the camera of the electronic device in the second photographing mode.

14. The electronic device according to claim 12, wherein when the electronic device executes the computer instructions, the electronic device performs the following operations:

recognizing a photographing scene and determining the second photographing mode based on the photographing scene; and displaying, in the preview interface, a first control corresponding to the second photographing mode, wherein the first operation is an operation performed on the first control.

15. The electronic device according to claim 14, wherein the first preview interface further comprises an AI scene recognition control, when the electronic device executes the computer instructions, the electronic device performs the following operations:

receiving a second operation performed on the AI scene recognition control; and the recognizing a photographing scene and determining the second photographing mode specifically comprises:

recognizing the photographing scene in response to the second operation, and determining the second photographing mode based on the photographing scene.

16. The electronic device according to claim 12, wherein when the electronic device executes the computer instructions, the electronic device performs the following operations:

after obtaining the preview data in the first photographing mode by using the camera, sending, by a camera hardware abstraction layer of the electronic device, the preview data in the first photographing mode to a camera service framework layer of the electronic device;

storing, by the camera service framework layer, the preview data in the first photographing mode in a memory region of a display control module at an application framework layer on the electronic device; and displaying, by the display control module in the preview box based on the preview data in the first photographing mode in the memory region of the display control module, the preview picture captured by the camera of the electronic device in the first photographing mode.

17. The electronic device according to claim 16, wherein when the electronic device executes the computer instructions, the electronic device performs the following operations:

detecting, by using a mode switching module in a camera application on the electronic device, the first operation of switching from the first photographing mode to the second photographing mode;

sending, by the mode switching module, a mode switching instruction to a blurry frame capture module in the camera application, and sending an instruction for switching to the second photographing mode to the camera hardware abstraction layer on the electronic device;

obtaining, by the blurry frame capture module, a memory address of the display control module at the application framework layer on the electronic device;

sending, by the blurry frame capture module, the memory address of the display control module to a GPU hardware rendering layer at the application framework layer; and after obtaining the memory address of the display control module, controlling, by the GPU hardware rendering layer, the GPU to obtain the raw image from the memory region corresponding to the memory address of the display control module.

18. The electronic device according to claim 17, wherein when the electronic device executes the computer instructions, the electronic device performs the following operations:

sending, by the blurry frame capture module, the memory address of the display control module to the GPU hardware rendering layer at the application framework layer by using a pixel copy interface.

19. The electronic device according to claim 18, wherein when the electronic device executes the computer instructions, the electronic device performs the following operations:

after obtaining the raw image of a first data type from the memory region corresponding to the memory address of the display control module, downsampling, by the GPU, the raw image of the first data type to the specified resolution, and converting the raw image of the first data type into the raw image of a specified data type to obtain the downsampled image, wherein a data type of the downsampled image is the specified type, and the specified type is different from the first data type; and returning, by the GPU, the downsampled image to the blurry frame capture module by using the GPU hardware rendering layer.

20. The electronic device according to claim 19, wherein when the electronic device executes the computer instructions, the electronic device performs the following operations:

after obtaining the downsampled image, performing, by the blurry frame capture module, blurring processing on the downsampled image to obtain the blurred image; and the displaying the blurred image in the preview box in a coverage manner specifically comprises:

controlling, by the blurry frame capture module, display of the blurred image in the preview box in a coverage manner.

* * * * *